(12) United States Patent
Patel et al.

(10) Patent No.: US 11,163,791 B2
(45) Date of Patent: Nov. 2, 2021

(54) TRANSFORMATION CONFIGURATION IN INSTANCE DATA REPLICATION WITH BI-DIRECTIONAL REPLICATION SUPPORT

(71) Applicant: ServiceNow, Inc., Santa Clara, CA (US)

(72) Inventors: Swapnesh Patel, Bothell, WA (US); Naga Padmaja Vattikuti, Fremont, CA (US); Sonam Gupta, Lynnwood, WA (US); Anand Vitthal Karandikar, Bothell, WA (US)

(73) Assignee: ServiceNow, Inc., Ssanta Clara, CA (US)

( * ) Notice: Subject to any disclaimer, the term of this patent is extended or adjusted under 35 U.S.C. 154(b) by 274 days.

(21) Appl. No.: 16/255,661

(22) Filed: Jan. 23, 2019

(65) Prior Publication Data

US 2020/0233877 A1 Jul. 23, 2020

(51) Int. Cl.
*G06F 16/00* (2019.01)
*G06F 16/27* (2019.01)
*G06F 16/22* (2019.01)
*G06F 16/25* (2019.01)
*G06F 9/54* (2006.01)

(52) U.S. Cl.
CPC .......... *G06F 16/27* (2019.01); *G06F 16/2282* (2019.01); *G06F 16/258* (2019.01); *G06F 9/542* (2013.01)

(58) Field of Classification Search
CPC .... G06F 16/27; G06F 16/2282; G06F 16/258; G06F 9/542
See application file for complete search history.

(56) References Cited

U.S. PATENT DOCUMENTS

| | | | |
|---|---|---|---|
| 6,178,425 B1 * | 1/2001 | Brodersen | ............... G06F 16/27 |
| 6,321,229 B1 | 11/2001 | Goldman | |
| 6,609,122 B1 | 8/2003 | Ensor | |
| 6,799,189 B2 | 9/2004 | Huxoll | |
| 6,816,898 B1 | 11/2004 | Scarpelli | |
| 6,895,586 B1 | 5/2005 | Brasher | |
| 7,020,706 B2 | 3/2006 | Cates | |
| 7,027,411 B1 | 4/2006 | Pulsipher | |
| 7,028,301 B2 | 4/2006 | Ding | |

(Continued)

OTHER PUBLICATIONS

International Search Report and Written Opinion for PCT Application No. PCT/US2020/014099 dated Apr. 24, 2020; 15 pgs.

*Primary Examiner* — Alexander Khong
(74) *Attorney, Agent, or Firm* — Fletcher Yoder PC

(57) ABSTRACT

Transformation configuration data is set for a consumer replication set on a consumer instance to replicate on the consumer instance data of a source table included in a producer replication set on a producer instance. The transformation configuration data includes configuration data of at least one of: (i) a target table from among a plurality of tables on the consumer instance that is specified in the consumer replication set as a table for loading on the consumer instance, incoming data from the source table; and (ii) a specified mapping of incoming fields of the source table with respective fields of the target table. Replication event data of a data modification event associated with a record on the source table is received. The received replication event data is transformed based on the set transformation configuration data, and loaded on the target table.

20 Claims, 12 Drawing Sheets

(56) References Cited

U.S. PATENT DOCUMENTS

| | | | |
|---|---|---|---|
| 7,031,974 B1* | 4/2006 | Subramaniam | G06F 16/27 |
| 7,062,683 B2 | 6/2006 | Warpenburg | |
| 7,131,037 B1 | 10/2006 | LeFaive | |
| 7,170,864 B2 | 1/2007 | Matharu | |
| 7,350,209 B2 | 3/2008 | Shum | |
| 7,392,300 B2 | 6/2008 | Anantharangachar | |
| 7,610,512 B2 | 10/2009 | Gerber | |
| 7,617,073 B2 | 11/2009 | Trinon | |
| 7,619,718 B2 | 11/2009 | Luo et al. | |
| 7,685,167 B2 | 3/2010 | Mueller | |
| 7,689,628 B2 | 3/2010 | Garg | |
| 7,716,353 B2 | 5/2010 | Golovinsky | |
| 7,783,744 B2 | 8/2010 | Garg | |
| 7,890,802 B2 | 2/2011 | Gerber | |
| 7,925,981 B2 | 4/2011 | Pourheidari | |
| 7,930,396 B2 | 4/2011 | Trinon | |
| 7,933,927 B2 | 4/2011 | Dee | |
| 7,945,860 B2 | 5/2011 | Vambenepe | |
| 7,966,398 B2 | 6/2011 | Wiles | |
| 8,051,164 B2 | 11/2011 | Peuter | |
| 8,082,222 B2 | 12/2011 | Rangarajan | |
| 8,141,261 B2 | 4/2012 | Sirota | |
| 8,224,683 B2 | 7/2012 | Manos | |
| 8,266,096 B2 | 9/2012 | Navarrete | |
| 8,380,645 B2 | 2/2013 | Kowalski | |
| 8,402,127 B2 | 3/2013 | Solin | |
| 8,457,928 B2 | 6/2013 | Dang | |
| 8,478,569 B2 | 7/2013 | Scarpelli | |
| 8,554,750 B2 | 10/2013 | Rangaranjan | |
| 8,612,408 B2 | 12/2013 | Trinon | |
| 8,646,093 B2 | 2/2014 | Myers | |
| 8,674,992 B2 | 3/2014 | Poston | |
| 8,689,241 B2 | 4/2014 | Naik | |
| 8,743,121 B2 | 6/2014 | De Peuter | |
| 8,745,040 B2 | 6/2014 | Kowalski | |
| 8,812,539 B2 | 8/2014 | Milousheff | |
| 8,818,994 B2 | 8/2014 | Kowalski | |
| 8,832,652 B2 | 9/2014 | Mueller | |
| 8,887,133 B2 | 11/2014 | Behnia | |
| 9,015,188 B2 | 4/2015 | Behne | |
| 9,037,536 B2 | 5/2015 | Vos | |
| 9,065,783 B2 | 6/2015 | Ding | |
| 9,098,322 B2 | 8/2015 | Apte | |
| 9,122,552 B2 | 9/2015 | Whitney | |
| 9,137,115 B2 | 9/2015 | Mayfield | |
| 9,239,857 B2 | 1/2016 | Trinon | |
| 9,323,801 B2 | 4/2016 | Morozov | |
| 9,363,252 B2 | 6/2016 | Mueller | |
| 9,412,084 B2 | 9/2016 | Kowalski | |
| 9,467,344 B2 | 10/2016 | Gere | |
| 9,535,737 B2 | 1/2017 | Joy | |
| 9,557,969 B2 | 1/2017 | Sharma | |
| 9,613,070 B2 | 4/2017 | Kumar | |
| 9,654,473 B2 | 5/2017 | Miller | |
| 9,659,051 B2 | 5/2017 | Hutchins | |
| 9,645,833 B2 | 6/2017 | Mueller | |
| 9,766,935 B2 | 9/2017 | Kelkar | |
| 9,792,387 B2 | 10/2017 | George | |
| 9,805,322 B2 | 10/2017 | Kelkar | |
| 9,852,165 B2 | 12/2017 | Morozov | |
| 10,002,203 B2 | 6/2018 | George | |
| 2006/0190497 A1* | 8/2006 | Inturi | G06F 16/213 |
| 2009/0313311 A1* | 12/2009 | Hoffmann | G06F 11/2097 |
| 2010/0191884 A1* | 7/2010 | Holenstein | G06F 11/2094 |
| | | | 710/200 |
| 2012/0089566 A1* | 4/2012 | Effern | G06F 16/2379 |
| | | | 707/611 |
| 2015/0205849 A1* | 7/2015 | Jayapal | G06F 16/27 |
| | | | 707/636 |
| 2018/0150356 A1* | 5/2018 | Boshev | G06F 16/9566 |
| 2020/0125540 A1* | 4/2020 | Thatte | G06F 9/544 |

* cited by examiner

FIG. 7

TRANSFORMATION CONFIGURATION IN INSTANCE DATA REPLICATION WITH BI-DIRECTIONAL REPLICATION SUPPORT

TECHNICAL FIELD

Embodiments described herein generally relate to cloud computing, and more particularly, to replicating data between instances while applying transformation to the replicated data, and applying changes made to replicated data back to a source.

BACKGROUND

Cloud computing relates to sharing of computing resources that are generally accessed via the Internet. In particular, cloud computing infrastructure allows users to access a shared pool of computing resources, such as servers, storage devices, networks, applications, and/or other computing-based services. By doing so, users, such as individuals and/or enterprises, are able to access computing resources on demand that are located at remote locations in order to perform a variety of computing functions that include storing and/or processing computing data. For enterprise and other organization users, cloud computing provides flexibility in accessing cloud computing resources without accruing up-front costs, such as purchasing network equipment and investing time in establishing a private network infrastructure. Instead, by utilizing cloud computing resources, users are able redirect their resources to focus on core enterprise functions.

In today's communication networks, examples of cloud computing services a user may utilize include software as a service (SaaS) and platform as a service (PaaS) technologies. SaaS is a delivery model that provides software as a service rather than an end product. Instead of utilizing local network or individual software installations, software is typically licensed on a subscription basis, hosted on a remote machine, and accessed as needed. For example, users are generally able to access a variety of enterprise and/or information technology (IT) related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate enterprise operations without maintaining network infrastructure and/or allocating computing resources normally associated with these functions.

An enterprise utilizing the cloud-based developmental platform to access software services through SaaS or PaaS delivery models may subscribe to one or more cloud-based instances to access these services. Alternately, respective cloud-based instances of various enterprises may interact with each other to provide different aspects of a service or handle respective functions of an enterprise. For example, multiple different cloud-based instances may be deployed for respective enterprise functions like human resources (HR), information technology (IT), compliance, and the like. As another example, some functions of an enterprise may be fulfilled by a different enterprise having a corresponding separate cloud-based instance. Some of the data on such interrelated cloud-based instances may be unique to that instance. However, some other data (e.g., user data, customer data, product catalog data, and the like) may overlap across the multiple interrelated instances. It may be desirable to replicate this data across the multiple instances.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment a method for replicating instance data includes: setting transformation configuration data for a consumer replication set on a consumer instance, the consumer replication set being configured to replicate on the consumer instance data of a source table included in a producer replication set on a producer instance, wherein the transformation configuration data includes configuration data of at least one of: (i) a target table from among a plurality of tables on the consumer instance that is specified in the consumer replication set as a table for loading on the consumer instance, incoming data from the source table included in the producer replication set; and (ii) a specified mapping of incoming fields of the source table of the producer replication set with respective fields of the target table in the consumer replication set on the consumer instance; receiving, via a logging infrastructure communicatively coupled to the producer and consumer instances, replication event data of a data modification event associated with a record on the source table included in the producer replication set; transforming the received replication event data on the consumer instance based on the set transformation configuration data; and loading the transformed replication event data on the specified target table in the consumer replication set on the consumer instance.

In another embodiment, the method may be embodied in computer executable program code and stored in a non-transitory storage device. In yet another embodiment, the method may be implemented on a computer system.

BRIEF DESCRIPTION OF DRAWINGS

For a more complete understanding of this disclosure, reference is now made to the following brief description, taken in connection with the accompanying drawings and detailed description, wherein like reference numerals represent like parts.

FIG. 7 illustrates another embodiment of a consumer replication entry of a consumer replication set a user can create on a user interface to set transformation configuration data.

DESCRIPTION OF EMBODIMENTS

Figure 1:
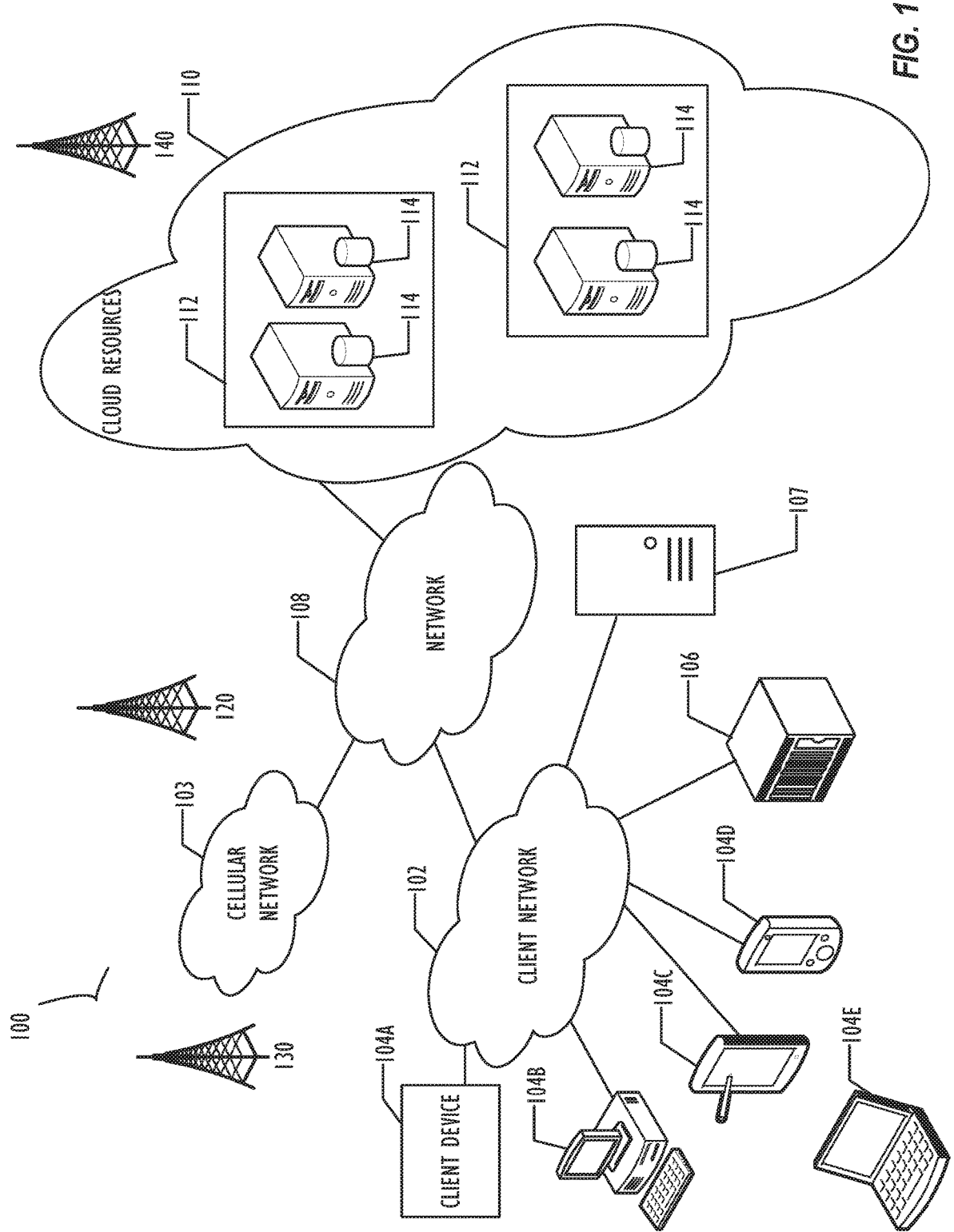
FIG. 1 illustrates a block diagram of a cloud computing infrastructure where one or more embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. Moreover, the language used in this disclosure has been principally selected for readability and instructional purposes, and may not have been selected to delineate or circumscribe the inventive subject matter, resorting to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

The term "computing system" is generally taken to refer to at least one electronic computing device that includes, but is not limited to a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

This disclosure pertains to transforming relational datasets that are being replicated or shared between instances prior to loading the replicated dataset on a destination (e.g., consumer) instance. This disclosure further relates to providing 'sticky' (e.g., bi-directional) replication support so that any change made to a record of a relational dataset replicated to the consumer instance is replicated back to the source (e.g., originator or producer instance). The relational datasets may be replicated between instances by providing capability within the producer instance to configure table-to-table replication (e.g., mirrored schema or transformed schema) and filterable published data set for consumption by one or more consumer instances in a reliable, scalable and secure manner. For example, a user (e.g., administrator) of the producer instance may create and activate a producer replication set that includes one or more producer replication entries having respective one or more source tables of the producer instance whose records are to be replicated on one or more consumer instances continuously and in real-time (e.g., via one or more scheduled jobs). Upon activation of the producer replication set, record data (or part of the data) of the source table of the producer replication set (e.g., that meets predetermined criteria) may be published for consumption by subscriber consumer instances via a logging infrastructure. A user (e.g., administrator) of the consumer instance may subscribe to the producer replication set to configure replication of source table data included in the producer replication set onto a specified target table on the consumer instance. The user of the consumer instance may subscribe to the producer replication set using producer replication configuration data (e.g., replication setup information) regarding the producer replication set (e.g., producer replication set name, producer replication set ID, shared key for authentication, producer instance name, producer instance ID, and the like).

The user of the consumer instance may further set transformation configuration data on the consumer instance to transform incoming source table data of the producer replication set prior to loading the incoming data onto the specified target table of the consumer instance. The transformation configuration data may specify (e.g., based on user selection) a target table from among a plurality of tables of the consumer instance on which the incoming source table data is to be loaded. This target table may be different from (e.g., has a different schema or different number or types of columns or fields) the source table on the producer instance. The target table may be a user created table or any other pre-existing table on consumer instance. The transformation configuration data may further specify a mapping of incoming fields or columns of the source table of the producer replication set with respective fields or columns of the target table of a consumer replication entry of the consumer replication set. Incoming data of the various columns of the source table and associated with a particular record may be loaded on the target table based on the column mapping specified in the transformation configuration data.

Still further, the transformation configuration data may specify a respective adapter for one or more of the respective mapped fields or columns of the target table. Each adapter may apply a predetermined rule for changing corresponding incoming data so that when a record from the source table is received, data corresponding to a particular field of the record of the source table is changed based on a corresponding adapter specified for a corresponding mapped field or column of the target table on the consumer instance based on the transformation configuration data, and the changed data is then loaded onto the corresponding mapped field. For example, the adapter may concatenate a predetermined alphanumeric string to incoming field data or value, change a time zone, convert currency, perform a predetermined mathematical operation, split incoming data into multiple fields based on predetermined criteria, and the like.

Once the subscription is activated (e.g., instance data replication between producer and consumer instance is active), in response to detecting a data modification event at the producer instance (e.g., insert, update or delete event associated with a record of the replication source table of the producer replication set on the producer instance), and replication event data of the data modification event may be published to a logging infrastructure for consumption by a subscriber (e.g., consumer) instance. The data modification event may be detected by continuously monitoring the source table of the producer replication set for changes (e.g., via a scheduled job). The logging infrastructure may be a publish/subscribe-model messaging platform (e.g., Java Messaging Service®, Rabbit MQ®, Apache® Kafka®, Apache ActiveMQ®) for distributed, reliable, dynamic and scalable transport of a continuous stream of data (e.g., data modification events associated with records of the one or more source tables of the producer replication set; the data may be in the form of a JSON or XML file) from a producer instance to a consumer instance. Apache, Kafka and ActiveMQ are registered trademarks of the Apache Software Foundation. The subscribing consumer instance may read the replication event data from the logging infrastructure (or from another logging infrastructure where the data is duplicated) via, e.g., a scheduled job. The consumer instance may utilize the set transformation configuration data to transform the incoming source table record data via a transformation application programming interface (API), and load the transformed data (e.g., key-value pairs) into the target table on the consumer instance with the appropriate field or column mapping, and adapter rules specified by the transformation configuration data. Loading the transformed data on the target table on the consumer instance configures instance data replication of the record of the source table of the producer instance onto the target table of the consumer instance.

A user of one or both of the producer instance and the consumer instance may further selectively enable 'sticky' (e.g., bi-directional) replication between the producer and consumer instances. For example, the user of the producer instance may set a sticky replication flag to true when configuring the producer replication set. As a result, upon activation of the producer replication set (with sticky replication enabled) and the consumer replication set of the consumer instance subscribing to the producer replication set, corresponding sticky producer and consumer replication sets may automatically be created at the consumer and producer instances respectively, and sticky replication activated, based on the producer and consumer replication configuration data. The consumer instance may further configure a tracking engine (e.g., replication source tracker) to track a plurality of records of the source table whose incoming replication event data has been loaded on the target table of the consumer instance. The consumer instance may then automatically detect a sticky modification event (e.g., insert, update or delete event associated with a record that is on the target table on the consumer instance and that is one of the plurality of records tracked by the tracking engine) of the sticky producer replication set at the consumer instance, and generate and publish a delta payload (e.g., difference between a version of the record prior to the associated sticky modification event and a version of the record subsequent to the modification) corresponding to the sticky modification event to the logging infrastructure for consumption by the sticky consumer replication set at the producer instance. The producer instance may then receive the incoming delta payload of the sticky record from the consumer instance, (optionally) de-transform the incoming delta payload based on the set transformation configuration data, field or column mapping, and set adapters, and load the transformed delta payload back to the corresponding record on the source table to thereby update the record on the source table at the producer instance based on the changes made to the corresponding replicated record on the target table at the consumer instance.

FIG. 1 illustrates a block diagram of an embodiment of a cloud computing infrastructure 100 where one or more embodiments of the present disclosure may operate. Cloud computing infrastructure 100 comprises a client network 102, network 108, and a cloud resources platform/network 110. In one embodiment, the client network 102 may be a local private network such as LAN that includes a variety of network devices that include, but are not limited to switches, servers, and routers. Each of these networks can contain wired or wireless programmable devices and operate using any number of network protocols (e.g., TCP/IP) and connection technologies (e.g., Wi-Fi® networks, Bluetooth®). Wi-Fi is a registered trademark of the Wi-Fi Alliance. Bluetooth is a registered trademark of Bluetooth Special Interest Group. In another embodiment, client network 102 represents an enterprise network that could include or be communicatively coupled to one or more local area networks (LANs), virtual networks, data centers and/or other remote networks (e.g., 108, 110). As shown in FIG. 1, client network 102 may be connected to one or more client devices 104A-E and allow the client devices to communicate with each other and/or with cloud resources platform/network 110. Client devices 104A-E may be computing systems such as desktop computer 104B, tablet computer 104C, mobile phone 104D, laptop computer (shown as wireless) 104E, and/or other types of computing systems generically shown as client device 104A. FIG. 1 also illustrates that client network 102 may be connected to a local compute resource 106 that may include a server, access point, router, or other device configured to provide for local computational resources and/or to facilitate communication amongst networks and devices. For example, local compute resource 106 may be one or more physical local hardware devices configured to communicate with wireless network devices and/or facilitate communication of data between client network 102 and other networks such as network 108 and cloud resources platform/network 110. Local compute resource 106 may also facilitate communication between other external applications, data sources, and services, and client network 102.

FIG. 1 also illustrates that client network 102 may be connected to a computer configured to execute a management, instrumentation, and discovery (MID) server 107. For example, MID server 107 may be a Java® application that runs as a Windows® service or UNIX® daemon. Java is a registered trademark of Oracle America, Inc. Windows is a registered trademark of Microsoft Corporation. UNIX is a registered trademark of The Open Group. MID server 107 may be configured to assist functions such as, but not necessarily limited to, discovery, orchestration, service mapping, service analytics, and event management. MID server 107 may be configured to perform tasks for a cloud-based instance while never initiating communication directly to the cloud-based instance by utilizing a work queue architecture. This configuration may assist in addressing security concerns by eliminating that path of direct communication initiation.

Cloud computing infrastructure 100 also includes cellular network 103 for use with mobile communication devices. Mobile cellular networks support mobile phones and many other types of mobile devices such as laptops etc. Mobile devices in cloud computing infrastructure 100 are illustrated as mobile phone 104D, laptop 104E, and tablet 104C. A mobile device such as mobile phone 104D may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices such as wireless access points and routers (e.g., local compute resource 106). In addition, the mobile devices may interact with other mobile devices or with non-mobile devices such as desktop computer 104B and various types of client device 104A for desired services. Although not specifically illustrated in FIG. 1, client network 102 may also include a dedicated network device (e.g., gateway or router) or a combination of network devices that implement a customer firewall or intrusion protection system.

FIG. 1 illustrates that client network 102 is coupled to a network 108. Network 108 may include one or more computing networks, such as other LANs, wide area networks (WANs), the Internet, and/or other remote networks, in order to transfer data between client devices 104A-E and cloud resources platform/network 110. Each of the computing networks within network 108 may contain wired and/or wireless programmable devices that operate in the electrical and/or optical domain. For example, network 108 may include wireless networks, such as cellular networks in addition to cellular network 103. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio-based networks as would be appreciated by one of ordinary skill in the art upon viewing this disclosure. Network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, cloud resources platform/network 110 is illustrated as a remote network (e.g., a cloud network) that is able to communicate with client devices 104A-E via client network 102 and network 108. The cloud resources platform/network 110 acts as a platform that provides additional computing resources to the client devices 104A-E and/or client network 102. For example, by utilizing the cloud resources platform/network 110, users of client devices 104A-E may be able to build and execute applications, such as automated processes for various enterprise, IT, compliance and/or other organization-related functions. These applications may be provided in two or more instances deployed on cloud resources platform/network 110 for users of client devices 104A-E of an enterprise. In one embodiment, the cloud resources platform/network 110 includes one or more data centers 112, where each data center 112 could correspond to a different geographic location. Within a particular data center 112 a cloud service provider may include a plurality of server instances 114. Each server instance 114 may be implemented on a physical computing system, such as a single electronic computing device (e.g., a single physical hardware server) or could be in the form of a multi-computing device (e.g., multiple physical hardware servers). Examples of server instances 114 include, but are not limited to, a web server instance (e.g., a unitary Apache installation), an application server instance (e.g., unitary Java Virtual Machine), and/or a database server instance (e.g., a unitary MySQL® catalog). MySQL is a registered trademark of MySQL AB.

To utilize computing resources within cloud resources platform/network 110, network operators may choose to configure data centers 112 using a variety of computing infrastructures. In one embodiment, one or more of data centers 112 are configured using a multi-tenant cloud architecture such that a single server instance 114, which can also be referred to as an application instance, handles requests and serves more than one customer. In some cases, data centers with multi-tenant cloud architecture commingle and store data from multiple customers, where multiple client instances are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 114 causing outages for all customers allocated to the single server instance 114.

In another embodiment, one or more of the data centers 112 are configured using a multi-instance cloud architecture to provide every customer its own unique client instance (e.g., producer instance, consumer instance, and the like). For example, a multi-instance cloud architecture could provide each client instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each client instance. In a multi-instance cloud architecture, multiple client instances could be installed on a single physical hardware server where each client instance is allocated certain portions of the physical server resources, such as computing memory, storage, and processing power. By doing so, each client instance has its own unique software stack that provides the benefit of data isolation, relatively less downtime for customers to access the cloud resources platform/network 110, and customer-driven upgrade schedules. Multiple client instances may also be deployed for a single customer to further customize upgrade schedules and provide separation different functions or operational units of the customer. An example of implementing a client instance within a multi-instance cloud architecture will be discussed in more detail below when describing FIG. 2.

Figure 2:
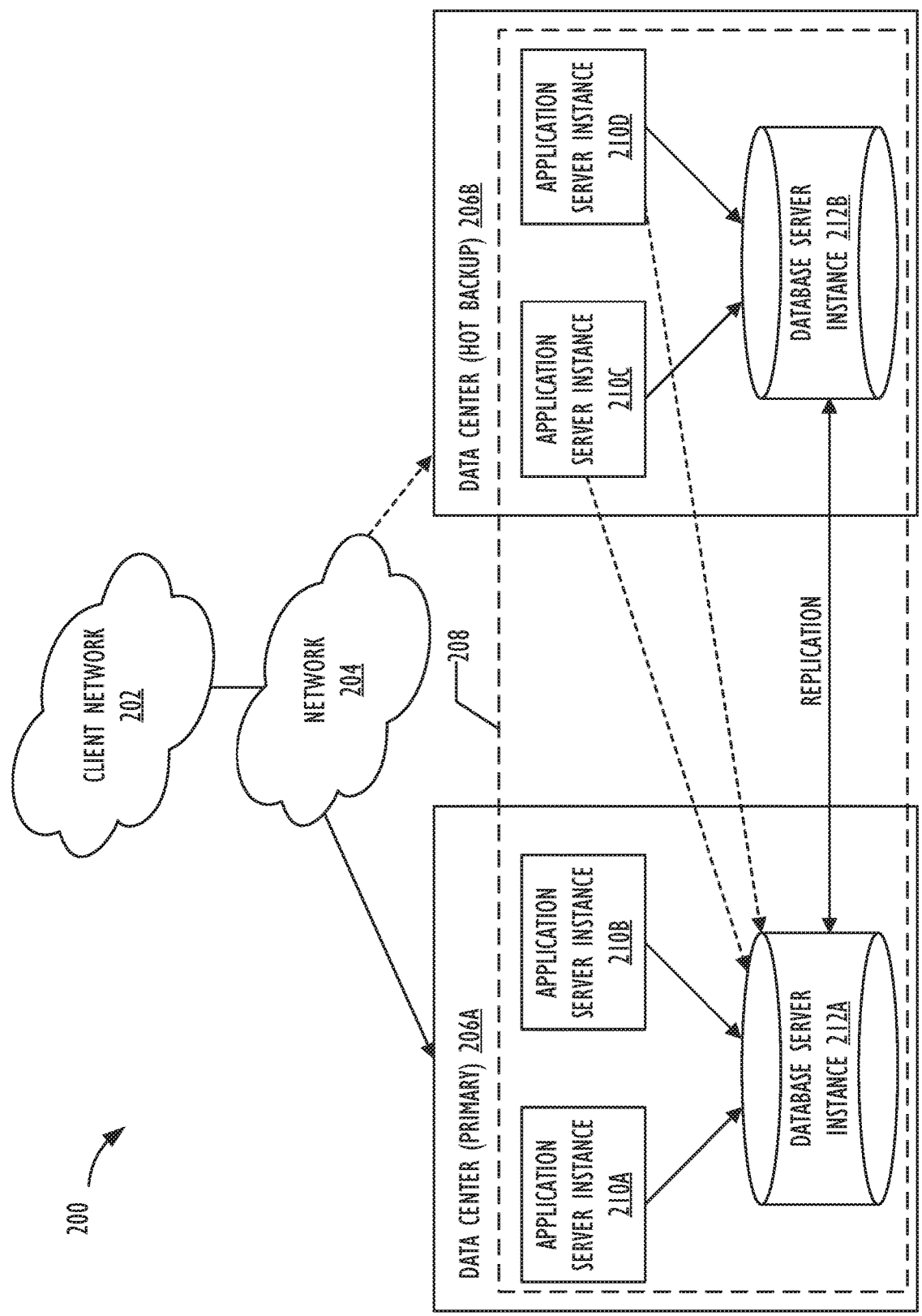
FIG. 2 illustrates a block diagram of a multi-instance cloud architecture where one or more embodiments of the present disclosure may operate.

In one embodiment, utilizing a multi-instance cloud architecture, a first client instance may be configured with a client-side application interface such as, for example, a web browser executing on a client device (e.g., one of client devices 104A-E of FIG. 1). FIG. 2 illustrates a block diagram of an embodiment of a multi-instance cloud architecture 200 where embodiments of the present disclosure may operate. FIG. 2 illustrates that the multi-instance cloud architecture 200 includes a client network 202 that connects to two data centers 206A and 206B via network 204. Client network 202 and network 204 may be substantially similar to client network 102 and network 108 as described in FIG. 1, respectively. Data centers 206A and 206B can correspond to FIG. 1's data centers 112 located within cloud resources platform/network 110. Using FIG. 2 as an example, a client instance 208 (e.g., a producer instance acting as a source of replication data of an associated source table of a producer replication set, or a consumer instance acting as a consumer of the replication data of the producer instance) is composed of four dedicated application server instances 210A-210D and two dedicated database server instances 212A and 212B. Stated another way, the application server instances 210A-210D and database server instances 212A and 212B are not shared with other client instances 208. Other embodiments of multi-instance cloud architecture 200 could include other types of dedicated server instances, such as a web server instance. For example, client instance 208 could include the four dedicated application server instances 210A-210D, two dedicated database server instances 212A and 212B, and four dedicated web server instances (not shown in FIG. 2).

To facilitate higher availability of client instance 208, application server instances 210A-210D and database server instances 212A and 212B are shown to be allocated to two different data centers 206A and 206B, where one of data centers 206 may act as a backup data center. In reference to FIG. 2, data center 206A acts as a primary data center that includes a primary pair of application server instances 210A and 210B and primary database server instance 212A for client instance 208, and data center 206B acts as a secondary data center to bark up primary data center 206A for client instance 208. To back up primary data center 206A for client instance 208, secondary data center 206B includes a secondary pair of application server instances 210C and 210D and a secondary database server instance 212B. Primary database server instance 212A is able to replicate data to secondary database server instance 212B. As shown in FIG. 2, primary database server instance 212A replicates data to secondary database server instance 212B using a replication operation such as, for example, a Master-Master MySQL Binlog replication operation. The replication of data between data centers could be implemented in real time or by implementing full backup weekly and daily incremental backups in both data centers 206A and 206B. Having both a primary data center 206A and secondary data center 206B allows data traffic that typically travels to the primary data center 206A for client instance 208 to be diverted to secondary data center 206B during a failure and/or maintenance scenario. Using FIG. 2 as an example, if application server instances 210A and 210B and/or primary data server instance 212A fail and/or are under maintenance, data traffic for client instance 208 can be diverted to secondary application server instances 210C and 210D and secondary database server instance 212B for processing.

Although FIGS. 1 and 2 illustrate specific embodiments of cloud computing infrastructure 100 and multi-instance cloud architecture 200, respectively, the disclosure is not limited to the specific embodiments illustrated in FIGS. 1 and 2. For example, although FIG. 1 illustrates that cloud resources platform/network 110 is implemented using data centers, other embodiments of the cloud resources platform/network 110 are not limited to data centers and can utilize other types of remote network infrastructures. Moreover, other embodiments of the present disclosure may combine one or more different server instances into a single server instance. Using FIG. 2 as an example, application server instances 210 and database server instances 212 can be combined into a single server instance. The use and discussion of FIGS. 1 and 2 are only exemplary to facilitate ease of description and explanation.

Figure 3:
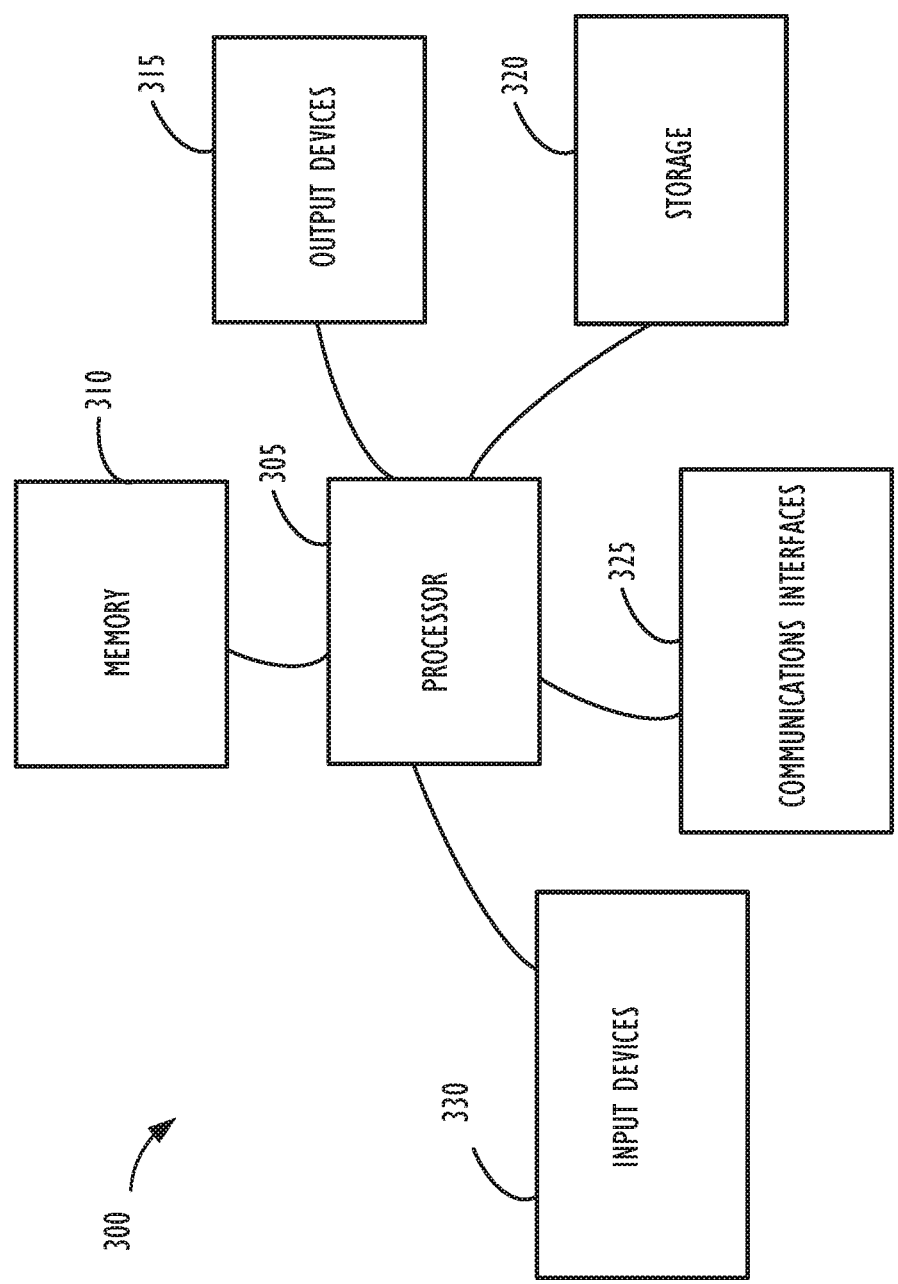
FIG. 3 illustrates a high-level block diagram of a processing device (computing system) that may be used to implement one or more disclosed embodiments.

FIG. 3 illustrates a high-level block diagram 300 of a processing device (computing device or system) that may be used to implement one or more disclosed embodiments (e.g., cloud resources platform/network 110, client devices 104A-104E, client instance 208, server instances 114, data centers 206A-206B, producer instance, consumer instance, etc.). For example, computing device 300 illustrated in FIG. 3 could represent a client device or a physical server device and include either hardware or virtual processor(s) depending on the level of abstraction of the computing device. In some embodiments, (without abstraction) computing device 300 and its elements as shown in FIG. 3 each relate to physical hardware, and in other embodiments, one, more, or all of the elements could be implemented using emulators or virtual machines as levels of abstraction. In any case, no matter how many levels of abstraction away from the physical hardware, computing device 300 at its lowest level may be implemented on physical hardware. As also shown in FIG. 3, computing device 300 may include one or more input devices 330, such as a keyboard, mouse, touchpad, or sensor readout (e.g., biometric scanner) and one or more output devices 315, such as displays, speakers for audio, or printers. Some devices may be configured as input/output devices also (e.g., a network interface or touchscreen display). Computing device 300 may also include communications interfaces 325, such as a network communication unit that could include a wired communication component and/or a wireless communications component, which may be communicatively coupled to processor 305. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication (PLC), Wi-Fi, cellular, and/or other communication methods.

As illustrated in FIG. 3, processing device 300 includes a processing element such as processor 305 that contains one or more hardware processors, where each hardware processor may have a single or multiple processor cores. In one embodiment, the processor 305 may include at least one shared cache that stores data (e.g., computing instructions) that are utilized by one or more other components of processor 305. For example, the shared cache may be a locally cached data stored in a memory for faster access by components of the processing elements that make up processor 305. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) or a microprocessor. Although not illustrated in FIG. 3, the processing elements that make up processor 305 may also include one or more other types of hardware processing components, such as graphics processing units (GPUs), application specific integrated circuits (ASICs), field-programmable gate arrays (FPGAs), and/or digital signal processors (DSPs).

FIG. 3 illustrates that memory 310 may be operatively and communicatively coupled to processor 305. Memory 310 may be a non-transitory medium configured to store various types of data. For example, memory 310 may include one or more volatile devices such as random access memory (RAM). Non-volatile storage devices 320 can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage devices 320 may be used to store overflow data if allocated RAM is not large enough to hold all working data. The non-volatile storage devices 320 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 305. In one embodiment, the compiling process of the software program may transform program code written in a programming language to another computer language such that the processor 305 is able to execute the programming code. For example, the compiling process of the software program may generate an executable program that provides encoded instructions (e.g., machine code instructions) for processor 305 to accomplish specific, non-generic, particular computing functions.

After the compiling process, the encoded instructions may then be loaded as computer executable instructions or process steps to processor 305 from storage 320, from memory 310, and/or embedded within processor 305 (e.g., via a cache or on-board ROM). Processor 305 may be configured to execute the stored instructions or process steps in order to perform instructions or process steps to transform the computing device into a non-generic, particular, specially programmed machine or apparatus. Stored data, e.g., data stored by a storage device 320, may be accessed by processor 305 during the execution of computer executable instructions or process steps to instruct one or more components within the computing device 300.

A user interface (e.g., output devices 315 and input devices 330) can include a display, positional input device (such as a mouse, touchpad, touchscreen, or the like), keyboard, or other forms of user input and output devices. The user interface components may be communicatively coupled to processor 305. When the output device is or includes a display, the display can be implemented in various ways, including by a liquid crystal display (LCD) or a cathode-ray tube (CRT) or light emitting diode (LED) display, such as an organic LED (OLED) display. Persons of ordinary skill in the art are aware that the computing device 300 may comprise other components well known in the art, such as sensors, powers sources, and/or analog-to-digital converters, not explicitly shown in FIG. 3.

Figure 4:
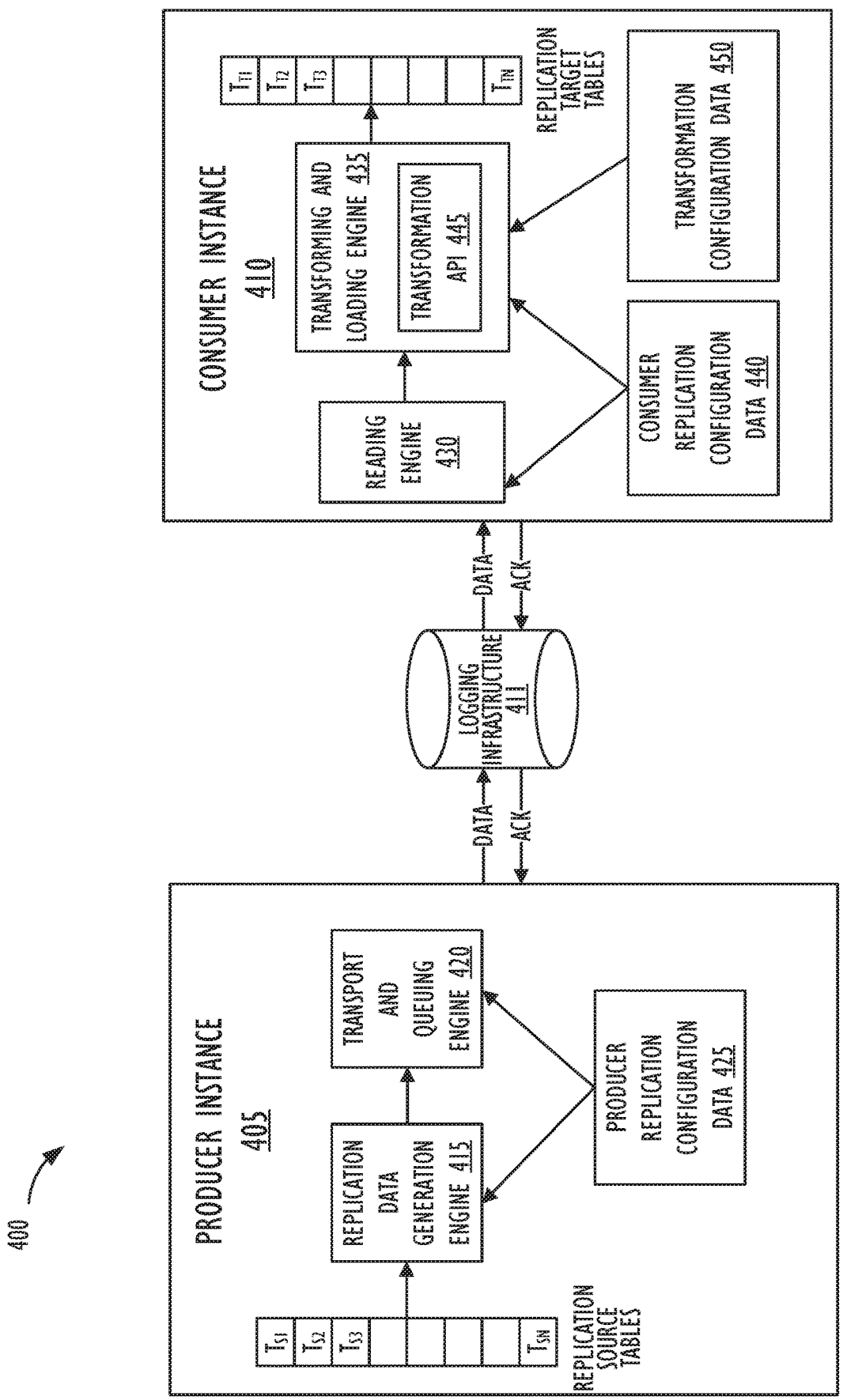
FIG. 4 illustrates a block diagram of an embodiment of an instance data replication system.

FIG. 4 illustrates a block diagram of instance data replication (IDR) system 400 where one or more embodiments of the present disclosure may operate. As shown in FIG. 4, IDR system 400 includes producer instance 405 and consumer instance 410 that are configured for instance data replication (or sharing) via logging infrastructure 411. Each of producer instance 405 and consumer instance 410 may be similar to client instance 208 of FIG. 2 and may belong to the same enterprise or to different enterprise customers subscribing to a cloud-based platform. For example, producer instance 405 may be associated with a core application (e.g., information technology service management (ITSM) application) of an enterprise, and consumer instance 410 may be associated with other secondary applications of the enterprise, such as an HR application, ticket management system, and/or help desk application. As another example, producer instance 405 may be a live production instance of the enterprise, while consumer instance 410 may be a sub-production instance that is being used by the enterprise for one or more predetermined purposes (e.g., development, testing, system redundancy, and the like). As yet another example, producer instance 405 may be the live production instance of the enterprise, while consumer instance 410 may be an internal instance used to provide support and other maintenance services to a plurality of live production instances of a plurality of enterprise customers. As yet another example, producer instance 405 could be a live production instance of a first enterprise, and consumer instance 410 could be a live production instance of a second, separate enterprise that provides a service or handles a predetermined function for the first enterprise. For example, the first enterprise might outsource to the second enterprise, task (e.g., ticket) support of an incident management system of the first enterprise. The second enterprise instance may then be configured to receive incident table data from the first enterprise instance, perform corresponding tasks based on the received data, update corresponding records based on performed tasks at the second enterprise instance, and send the updates back to the first enterprise instance.

In addition to the above use cases, it may also be desirable to have different applications deployed on different instances to, for example, control frequency of updates made to the different applications or instances without risking introduction of errors instance-wide for core applications and to meet service level agreement requirements. Thus, software versions of producer and consumer instances 405 and 410 need not be the same.

Each instance 405 and 410 may include proprietary data that may be stored in, for example, a relational database that organizes data into one or more tables (or relations) of columns and rows, with a unique key (e.g., sys_id) identifying each row and primary keys and foreign keys for defining relationships among the tables. For example, a unique primary key may identify each table and, when a new row is written to the table, a new unique value for the primary key may be generated, so that the unique key may uniquely identify a row within a table. Each table may represent one entity type (such as incident, user, customer, company, product, product catalogue, and the like), with each row (or record) of the table representing occurrences (e.g., user name or user ID, incident ID, customer name or customer ID) of that type of entity and each column (or attribute) of the table representing values attributed to that occurrence (e.g., address, department, incident description). As evident from the above, there may be use cases that require certain relational tables (e.g., user data tables, customer data tables, product data tables, and the like; referred to here as "source tables") of an enterprise associated with producer instance 405 to be replicated to one or more other instances (e.g., consumer instance 410) to share data and make the data available on the other instances.

As shown in FIG. 4, producer instance 405 may include replication source tables $T_{S1}$-$T_{SN}$ (corresponding to producer replication entries of one or more producer replication sets), replication data generation engine 415, transport and queuing engine 420 and producer replication configuration data 425. Producer replication configuration data 425 may include one or more tables that store information regarding one or more producer replication sets that include one or more producer replication entries having one or more replication source tables $T_{S1}$-$T_{SN}$, whose data is actively being published by producer instance 405 for consumption and replication by one or more consumer instances 410. For each producer replication set, producer replication configuration data 425 may include information regarding one or more corresponding producer replication entries of respective replication source tables $T_{S1}$-$T_{SN}$, producer replication set name, producer replication set ID, description, shared encryption/decryption key, producer instance 405 ID, metadata, information regarding one or more subscribing consumer instances 410 that are authorized to receive data from the producer replication set, one or more filter criteria (e.g., horizontal, vertical, or attachment filter criteria), and the like.

Replication data generation engine 415 may be an object or programming language class (e.g., Java application programming interface (API)) that is used for performing operations on the relational database of producer instance 405. As soon as the producer replication set is activated at producer instance 405, replication data generation engine 415 may start listening to the data modification events happening at the replication source table(s) and continuously monitor the replication source table(s) so that when a record on the replication source table is modified (e.g., insert, update or delete record on the source table; referred to here as a "data modification event"), replication data generation engine 415 may detect the modification and return zero or more records that have been modified from the source table as an ordered list (e.g., XML or JSON document(s)). Replication data generation engine 415 may return both records (e.g., rows) and fields (e.g., columns) based on the detection of the data modification event. In one embodiment, replication data generation engine 415 may generate a delta payload corresponding to the record that is modified so that only a modified portion (e.g., data of one of plural columns) of the record is queued for transport to subscribing consumer instance 410. Replication data generation engine 415 may further determine based on producer replication configuration data 425 whether the data modification event warrants generation of replication event data for publication based on whether the data modification event meets one or more filter criteria (e.g., record that matches a filter condition, change made to a column that is included in columns of the source table that are to be replicated on consumer instance, and the like) associated with the replication source table of the producer replication set. Thus, only data that is eligible for replication may be transported from producer instance 405 for consumption.

Transport and queuing engine 420 may receive the replication event data, that is associated with the data modification events and that is eligible for publication, in the form of messages (e.g., JSON or XML files) from replication data generation engine 415 and temporarily and sequentially store these messages into an outbound replication queue. Transport and queuing engine 420 may keep track of a cursor for determining which message is to be transported out next from the outbound replication queue so that even in the event of a network connection or server failure, message duplication or message skipping is avoided and the sequential order of message transport from the outbound replication queue is maintained. Thus, transport and queuing engine 420 may offer fault-tolerance and resilience features when transporting out the delta payload associated with the producer replication set or when performing an initial batch transport process of bootstrapping (or seeding) a corresponding specified target table of consumer instance 410, and resuming automatically after a failure without breaking the sequential order of message transport. Transport and queuing engine 420 may then sequentially read the messages stored in the outbound replication queue and transport the messages out to logging infrastructure 411 for publication. In one embodiment, transport and queuing engine 420 may stitch the outgoing messages by generating a linked list of the messages to ensure that none of the messages will be lost in transition between producer and consumer instances 405 and 410. Thus, transport and queuing engine 420 may act as a producer object that reads an outgoing message from the queue, stitch the message, transport the message to logging infrastructure 411, receive a confirmation from logging infrastructure 411 that the transported message was received successfully and persisted in the local base, read and stitch the next message in sequential order, and so on. Transport and queuing engine 420 may use hypertext transfer protocol (HTTP) or similar protocol to transmit the replication event data (e.g., JSON or XML file) to logging infrastructure 411.

Logging infrastructure 411 is a publish/subscribe-model messaging platform. Logging infrastructure 411 may be a message bus that is implemented using one or more message transport platforms like Java Messaging Service®, Rabbit MQ®, Apache® Kafka °, or Apache ActiveMQ®. (Apache, Kafka and ActiveMQ are registered trademarks of the Apache Software Foundation.) Alternately, logging infrastructure 411 may be implemented using any message-oriented middleware (MOM) that implements advanced message queuing protocol (AMQP) and includes hardware and/or software infrastructure that supports sending and receiving messages between distributed systems. Logging infrastructure 411 may be a streaming platform designed for a distributed architecture that provides a fast and scalable distributed messaging platform, capable of not just publish-and-subscribe, but also storage and processing of data within the stream. Proprietary platforms, such as the Confluent Platform, which improves Apache Kafka, may be utilized to implement logging infrastructure 411 by expanding integration capabilities, adding tools to optimize and manage Kafka clusters, and methods to ensure the streams are secure, thereby making it easier to build and operate logging infrastructure 411. Messages sequentially transported out of producer instance 405 by transport and queuing engine 420 may be received by logging infrastructure 411 and stored at a particular address for consumption by consumer instance 410 for a predetermined period of time (e.g., seven days). Logging infrastructure 411 may include a cluster of processing devices (e.g., processing devices 300) and may be deployed on one or more data centers 112 and one or more server instances 114 of cloud resources platform/network 110 of FIG. 1 as a shared service to enable multiple client instances 208 (e.g., multiple producer instances 405 and multiple consumer instances 410) to share data between each other. Since logging infrastructure 411 may be a shared service, messages stored in logging infrastructure 411 may be encrypted using shared keys of corresponding producer replication sets in order to ensure data security. For each consumer replication set (or entry) of consumer instance 410, logging infrastructure 411 may remember the last read offset based on consumer instance 410 ID in order to transmit messages (e.g., replication event data) to consumer instance 410 in sequential order. In one embodiment, logging infrastructure 411 may include multiple logging infrastructures hosted on multiple data centers hosting multiple producer and consumer instances, and messages between the multiple logging infrastructures may be replicated.

Consumer instance 410 may include reading engine 430, transforming and loading engine 435, consumer replication configuration data 440, transformation configuration data 450, and one or more replication target table(s) $T_{T1}$-$T_{TN}$ for storing incoming replication event data. Replication target tables $T_{T1}$-$T_{TN}$ may be associated with respective one or more consumer replication entries of one or more consumer replication sets on consumer instance 410. Consumer replication configuration data 440 may include data that is included in producer replication configuration data 425 and that may be utilized to subscribe to the producer replication set on producer instance 405. In particular, consumer replication configuration data 440 may include one or more tables that further store information regarding one or more consumer replication sets that include one or more consumer replication entries corresponding to one or more replication target tables $T_{T1}$-$T_{TN}$ where incoming replication data is to be loaded. That is, consumer replication configuration data 440 may store data generated (and/or entered by user) when consumer instance 410 subscribes to the producer replication set of producer instance 405. Thus, for each producer replication set, consumer replication configuration data 440 may include information regarding one or more corresponding replication source tables $T_{S1}$-$T_{SN}$, information regarding one or more corresponding replication target tables $T_{T1}$-$T_{TN}$, consumer replication set name, consumer replication set ID, producer replication set ID, consumer replication set description, shared encryption/decryption key, producer instance 405 ID, metadata, one or more filter criteria (e.g., horizontal, vertical, or attachment filter criteria), cursor data indicating topic address in logging infrastructure 411 from where consumer instance 410 may resume reading, and the like.

Reading engine 430 may use consumer replication configuration data 440 to read messages from particular topics on logging infrastructure 411 that are published by a particular producer instance 405 whose replication set has been subscribed to by consumer instance 410. For example, reading engine 430 may use consumer replication configuration data 440 like producer instance 405 ID, shared key, producer replication set name or ID, and the like to determine a topic address of a replication set associated with consumer instance 410 on logging infrastructure 411 from where reading engine 430 may read messages in sequential order for the subscribed producer replication set, and decrypt the read messages using the shared key to obtain replication event data associated with data modification events on the replication source table $T_{S1}$-$T_{SN}$ of the producer replication set of producer instance 405. Thus, using consumer replication configuration data 440, reading engine 430 may determine the name and address of the topic on logging infrastructure 411 from where reading engine 430 is to start reading the messages in sequential order. Reading engine 430 may further include logic to provide failover resilience features so that in the event of consumer instance 410 failover, reading engine 430 may keep track of the address from where reading engine 430 may resume reading from logging infrastructure 411 even when reading from a different implementation of logging infrastructure 411 belonging to a different data center where consumer instance 410 is deployed after failover to consume from (or produce to) a local logging infrastructure 411.

Transforming and loading engine 435 may then perform transformations on the read and decrypted (and de-serialized) replication event data and load the transformed data of the record onto corresponding replication target table $T_{T1}$-$T_{TN}$ of consumer instance 410 associated with the particular replication source table $T_{S1}$-$T_{SN}$ of producer instance 405, to apply the data modification event associated with the record of replication source table $T_{S1}$-$T_{SN}$ of producer instance 405 onto the corresponding record of replication target table $T_{T1}$-$T_{TN}$ of consumer instance 410. In one embodiment, transforming and loading engine 535 may include logic to handle uncommitted replication data responsive to occurrence of an exception.

More specifically, transforming and loading engine 435 includes transformation API 445 that utilizes transformation configuration data 450 to transform incoming replication event data based on configuration or settings specified by a user. For example, transforming and loading engine 435 may load incoming replication event data from a particular source table $T_{sn}$ to a particular target table $T_{Tn}$ based on the target table specified in transformation configuration data 450. Further, transforming and loading engine 435 may load data of respective columns or fields of the replication event data of the record from the source table $T_{sn}$ to corresponding respective columns or fields of the target table $T_{Tn}$ based on a mapping of the fields between the source and target tables specified by transformation configuration data 450. Still further, prior to loading the incoming data onto a particular field or column of target table $T_{Tn}$, transforming and loading engine 435 may also transform or convert the corresponding incoming data of the particular mapped column based on an adapter rule to change the incoming data in some predetermined way, in accordance with an adapter specified by transformation configuration data 450. More specific details of the operations performed by transforming and loading engine 435 are described in further detail below in connection with FIGS. 5-8. Transforming and loading engine 435 may also be configured to load configuration tables (e.g., scripts, workflows) associated with replication event data loaded onto replication target tables $T_{T1}$-$T_{TN}$ so that existing scripting logic (e.g., form auto fill, specific scripts or workflows invoked on insert, update or delete on table) of replication source tables $T_{S1}$-$T_{SN}$ of producer instance 405 is maintained at consumer instance 410.

Figure 5:
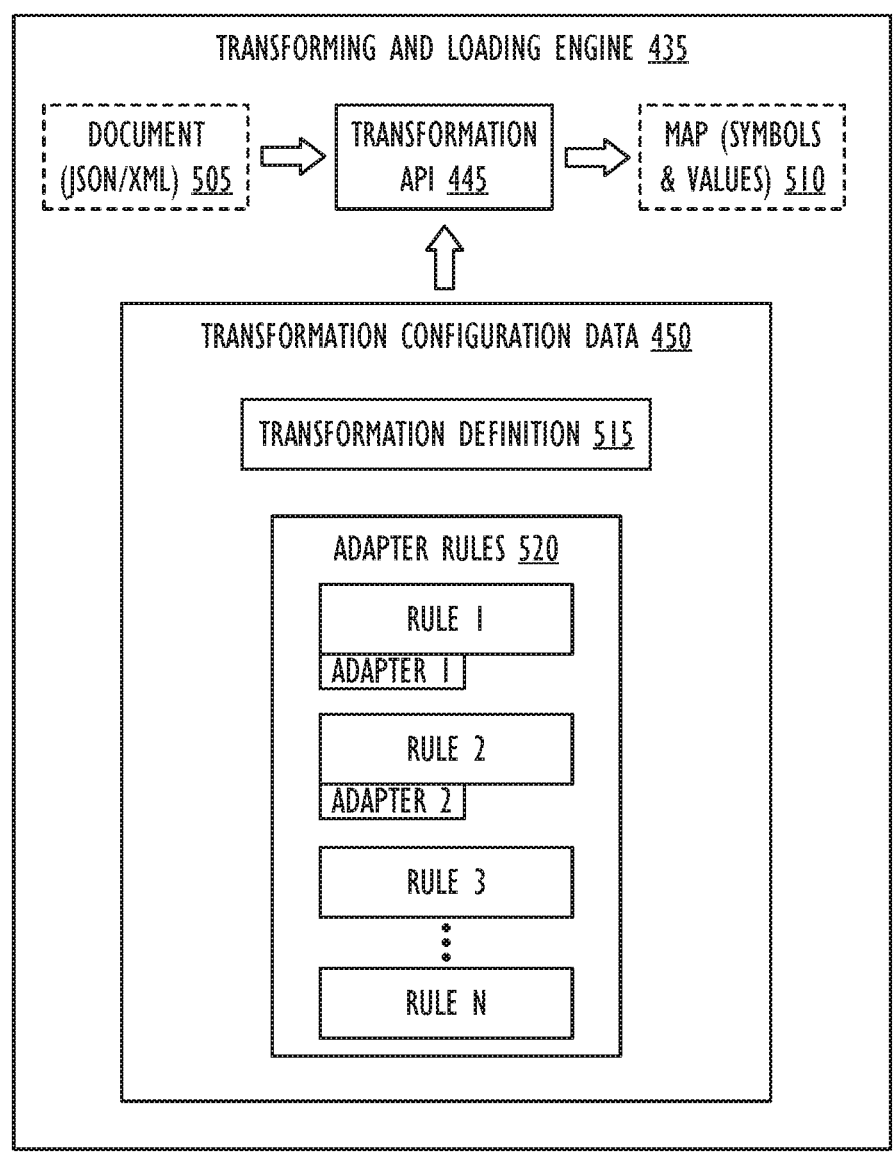
FIG. 5 illustrates a block diagram of a transforming and loading engine of the instance data replication system illustrated in FIG. 4, in accordance with one or more disclosed embodiments.

FIG. 5 illustrates block diagram 500 of transforming and loading engine 435 of instance data replication system 400 shown in FIG. 4, in accordance with one or more disclosed embodiments. As shown in FIG. 5, transforming and loading engine 435 includes transformation API 445 that receives document 505 as incoming replication event data from a particular source table $T_{S1}$-$T_{SN}$ of producer instance 405 and based on transformation definition 515 and adapter rules 520 of transformation configuration data 450, transformation API 445 converts or transforms document 505 to map 510 (e.g., map of key-value pairs) that can be loaded onto corresponding target table $T_{T1}$-$T_{TN}$ of consumer instance 410. More specifically, document 505 may be a JSON or XML document corresponding to the incoming replication event data that is read by reading engine 430 of FIG. 4 from logging infrastructure 411. Document 505 may include data in JSON or XML format for one or more columns or fields of a record on a source table on producer instance 405 that is being replicated to the target table based on producer and consumer replication configuration data. Transformation definition 515 may include a set of tables on consumer instance 410 that stores transformation configuration specified based on user operation for one or more producer replication entries of one or more producer replication sets of one or more producer instances 405. In addition, transformation definition 515 may specify a sequence (e.g., ordered sequence) in which a plurality of rules (Rule 1-Rule N) of adapter rules 520 are to be executed on incoming replication event data. Each rule of adapter rules 520 may specify a mapping between a particular column of a particular source table with a particular (e.g., user specified) column of a particular target table, the path structure for the particular column of the particular target table, and any adapter (e.g., Adapter 1 for Rule 1, Adapter 2 for Rule 2, and the like) that is to be applied to change corresponding data prior to loading on the target table based on the corresponding target path structure.

The adapter specified for each rule in adapter rules 520 may be set based on user operation and may be selected by the user from among a plurality of types of available adapters. The plurality of types of adapters may include a calculation adapter, a concatenation adapter, a currency adapter, a duration adapter, a fixed-width format adapter, a map adapter, a pattern adapter, a replace adapter, a split adapter, a task number adapter, and a time zone conversion adapter. The calculation adapter may be used to perform a specified mathematical operation on incoming producer data. For example, the calculation adapter may accept as input the mathematical operation to be applied and the value (e.g., a constant value), to output a value based on input replication event data value. The concatenation adapter may append a specified string to the source data. The currency adapter may convert one currency to another based on current exchange rates. The duration adapter may convert one time unit to another (e.g., convert minutes to seconds). The fixed-width format adapter may reformat fixed-width input data based on predetermined rules (e.g., convert "1234567890" to "(123) 456-7890"; convert "10,000" to "10000"; and the like). The map adapter may use comma-separated pairs of literals to map source-to-target conversions (e.g., convert "done" to "complete"; convert "PRB" to "TASK"; and the like). The pattern adapter may use regular expressions to identify input patterns. Pattern adapter may also allow inserting, prefixing and appending literal characters so that they appear in the adapter output (e.g., convert "[Last Name], [First Name]" to "[First Name] [Last Name]"). The replace adapter may replace a specified input string or substring with a specified string output (e.g., convert "Apple" to "Banana"). The split adapter may use a specified delimiter (e.g., space or comma) to break a string into two or more strings, and store them together or separately in one or more target columns or fields (e.g., convert "[First Name] [Last Name]" to "[Last Name], [First Name]"). The task number adapter may add a prefix or suffix to a task number, or replace the task number's prefix (e.g., convert "PRB80899" to "STRY80899"). And the time zone conversion adapter may convert from one time zone to another (e.g., convert "07:00 am GMT" to "00:00 am PDT").

Transformation API 445 may be configured to accept data as an XML or JSON file (document 505), transform the data based on the sequence of rules specified by transformation configuration data 450 (e.g., corresponding rules in adapter rules 520 that map columns of source table to columns of target table with any set data modifications via adapters) and output, e.g., key-value pairs (or column-value pairs; map 510) that can be loaded on any system (e.g., target table on consumer instance 410). Map 510 corresponds to the key-value pairs output for each column of the target table $T_{T1}$-$T_{TN}$ where incoming replication event data is to be loaded. In one embodiment, a Java class may be called to load the map 510 key-value pairs onto corresponding columns on the particular target table $T_{T1}$-$T_{TN}$.

Figure 6:
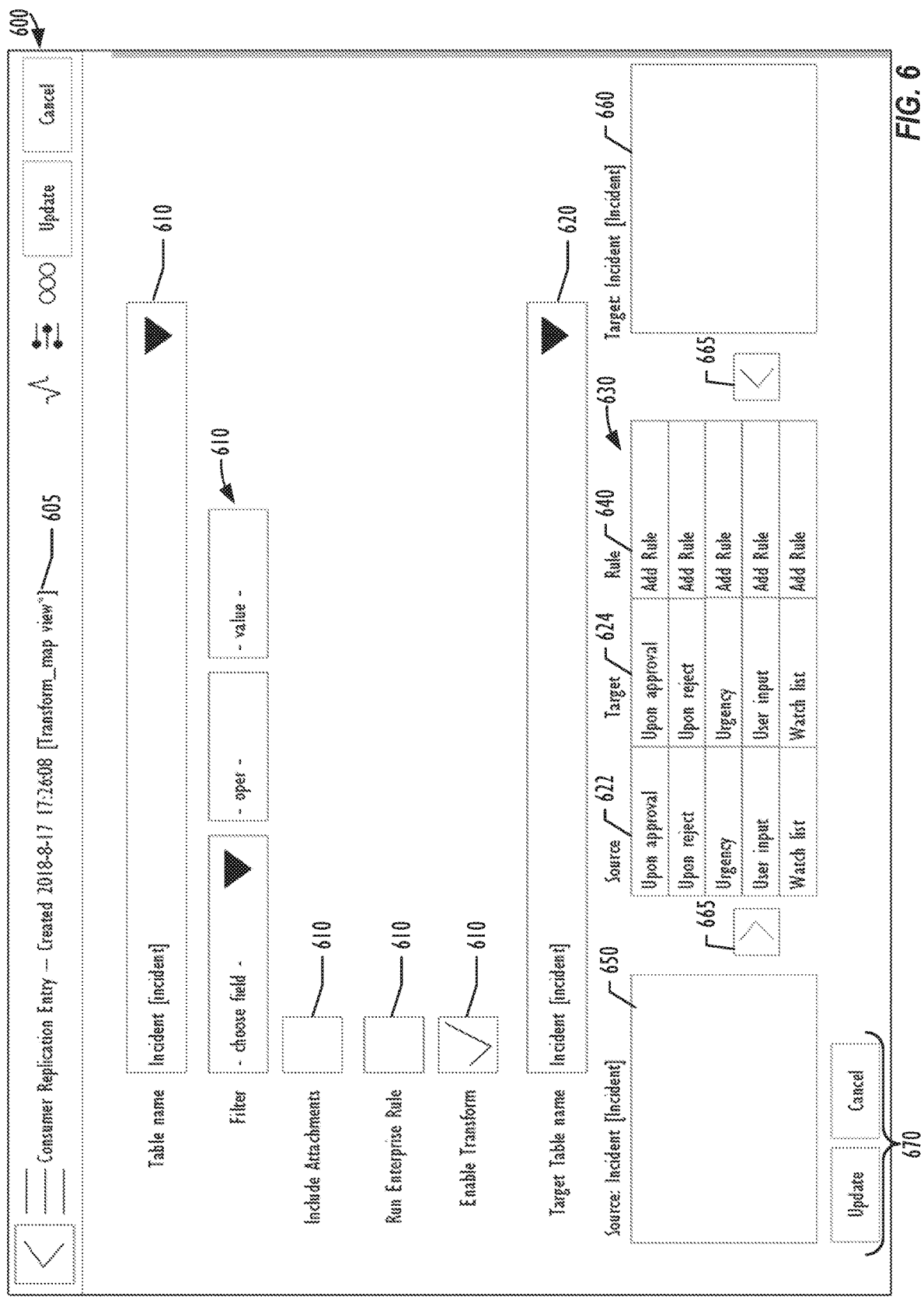
FIG. 6 illustrates an embodiment of a consumer replication entry of a consumer replication set a user can create on a user interface to set transformation configuration data.
Figure 7:
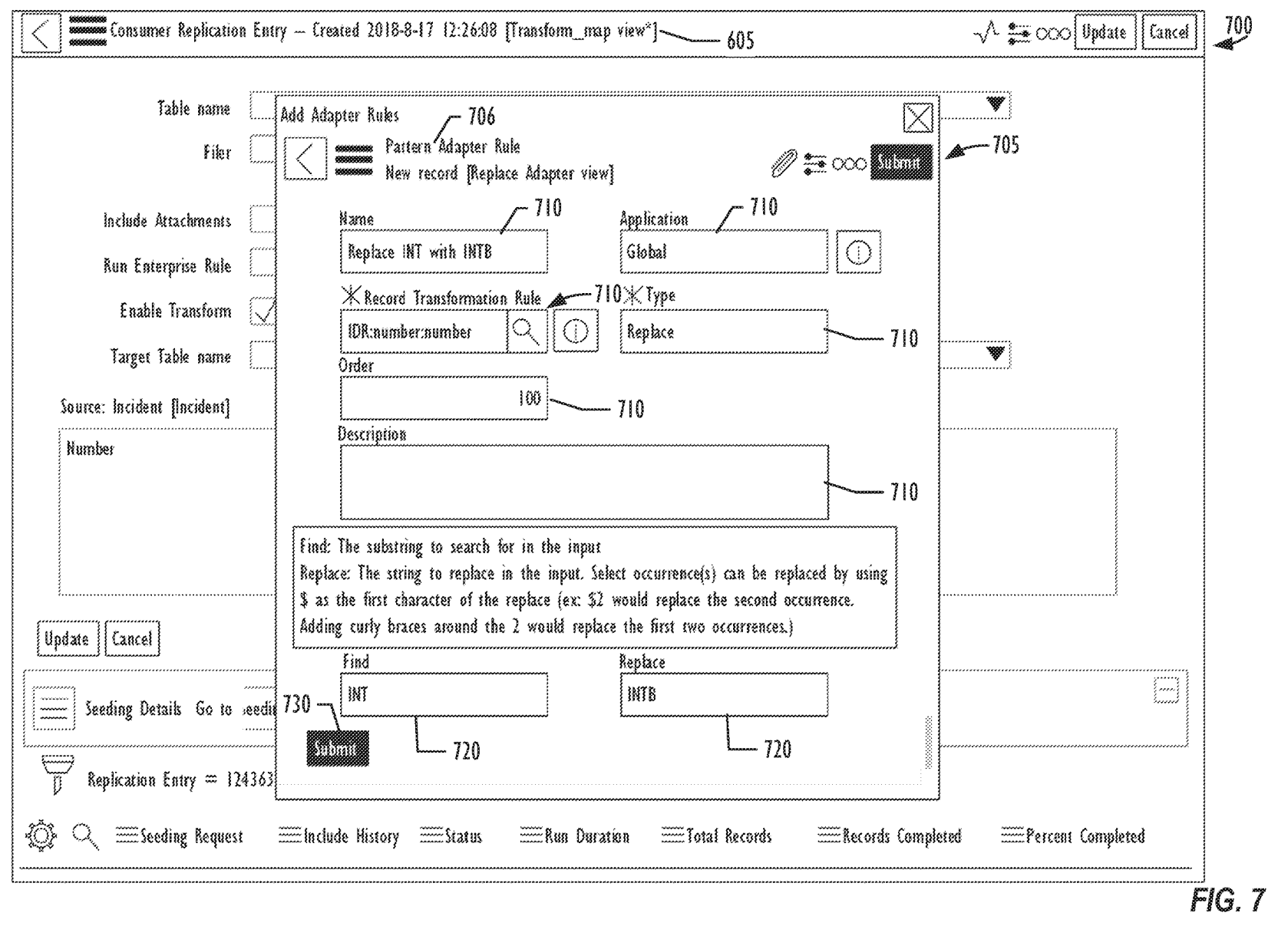
Figure 8:
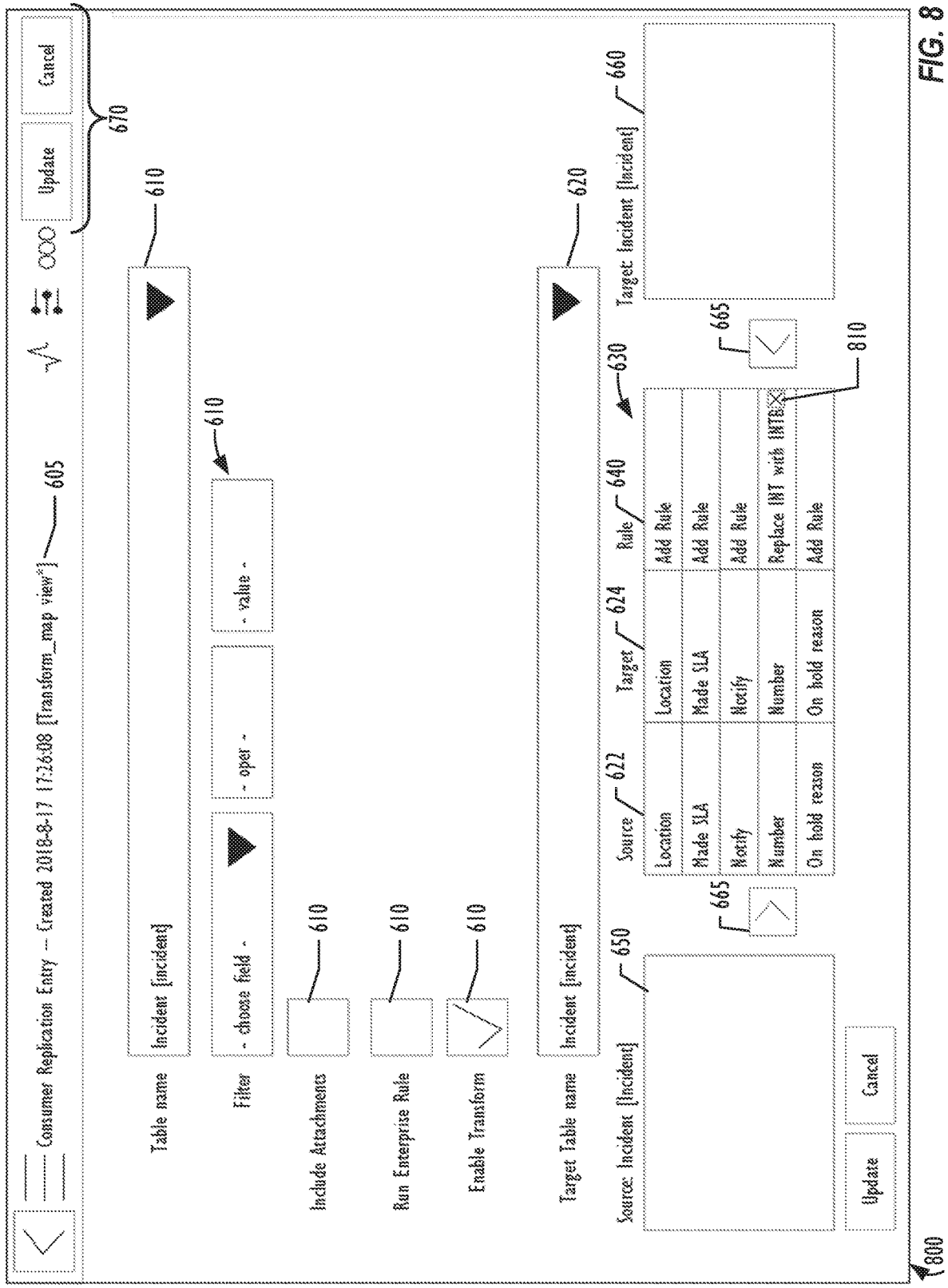
FIG. 8 illustrates another embodiment of a consumer replication entry of a consumer replication set a user can create on a user interface to set transformation configuration data.

FIGS. 6-8 illustrate embodiments of a user interface for creating a consumer replication entry of a consumer replication set, and setting transformation configuration data of the consumer replication entry. After creating a producer replication set on the producer instance, creating a consumer replication set on the consumer instance, and activating instance data replication between the producer and consumer replication sets, a user may further configure settings of a consumer replication entry of the consumer replication set that subscribes to the producer replication set by utilizing the exemplary user interface shown in FIGS. 6-8. For example, as shown in FIG. 6, the user may utilize user interface 600 to set attributes 610 associated with the consumer replication entry 605 of consumer replication set 605 on the consumer instance. In the exemplary embodiment shown in FIG. 6, consumer replication entry 605 correspond to a particular source table ("Incident" table) whose data is to be replicated to the consumer instance. Attributes 610 may include the source table name of the producer instance whose record data is being replicated on the consumer instance, filter criteria to set a filter condition on the incoming replication event data of the source table, a checkbox to selectively indicate whether or not attachments associated with records on the source table are to be replicated and loaded onto the target table of the consumer instance, a checkbox indicating whether or not an enterprise rule (e.g., enterprise logic or script) is to be run on the consumer instance, and a checkbox indicating whether or not data transformation is to be enabled with respect to the replication event data incoming from the source table of the producer instance. Thus, user interface 600 allows the user to check the "Enable Transform" checkbox 610 to indicate that the data transformation is enabled, and in response to enabling transformation, user interface 600 presents the user with attributes 620-660 to set transformation configuration data for the source table specified by the source table name attribute 610 of consumer replication entry 605.

Thus, if the checkbox to "Enable Transform" is unchecked, incoming replication event data is automatically loaded (without transformation) on a corresponding created (target) table (e.g., table having same table name as source table, and same schema (e.g., same number and types of columns or fields with same column names)) in consumer instance. If such a target table does not exist, the consumer instance may automatically create such a table or return an error message that the table does not exist. If, however, "Enable Transform" checkbox is checked, user interface 600 enables the user to set a specified table (e.g., any table including any pre-existing table or a newly created custom table) as a target table where incoming data from the source table is to be loaded. User interface 600 may enable the user to input Target Table Name 620 from a dropdown list of available tables on consumer instance. In displaying the list of available tables in the dropdown, user interface 600 may omit certain 'system' tables of consumer instance where loading of replication data may be prohibited. Otherwise, user interface 600 may allow the user to load incoming data on any user specified table regardless of whether a version of the software on producer instance is different from the software version on the consumer instance, and regardless of whether the tables names and/or table schema (e.g., name, number, and types of columns or fields of the table) of the source table on producer instance are different from those of the target table on consumer instance.

Based on the table selected at attribute 620, user interface 600 may perform an automatic initial mapping of incoming columns or fields of the source table 622 with columns or fields of the target table 624, and present the mapping to the user for review in table format 630. For example, user interface 600 may map columns or fields of the source table 622 with columns or fields of the target table 624 based on text similarity between the column or field names of the source table and the target table, and/or similarity between types of values the respective fields or columns hold. In the example shown in FIG. 6, when the user selects the "Incident" table as the target table 620 to load incoming replication event data of the "Incident" source table 610, user interface 600 maps incoming columns of the source table 622 with columns of the target table 624, so that "Upon approval" column of source 622 is mapped with "Upon approval" column of target 624, "Upon reject" column of source 622 is mapped with "Upon reject" column of target 624, and so on. Naturally, in the example embodiment shown in FIG. 6, since the user has selected the same table (i.e., "Incident") as the target for incoming data of the "Incident" table of the source, columns of the source and target tables match seamlessly and hence, user interface 600 is able to automatically and accurately map 630 the columns of the source and target tables. However, user interface 600 may be configured to automatically map (or enable the user to manually update the initial automatic mapping) the columns and present the mapping in table format 630 even when the source and target tables are different from each other (e.g., have different names, and/or schema). In this case, as explained above, user interface 600 may map columns based on, e.g., text similarity between column names of the source and target columns, and the type of data a column is configured to store. User interface 600 may present mapped columns in table format 630, and present any unmapped columns of the source table in box 650, and present any unmapped columns of the target table in box 660. The user interface 600 thus enables the user to review the mapping of incoming data into the target table, and manually update the mapping by selecting a particular row (which may be an empty row) in table format 630, and clicking arrows 665 to manually map a particular incoming column of source table listed in box 650 with a particular column of target table listed in box 660.

Further, user interface 600 enables the user to set an adapter for any of one or more of the mapped rows in table format 630 by clicking on a corresponding "Add Rule" link 640 in table format 630. In one embodiment, in response to the user clicking on link 640 for a given row in table format 630, as shown in FIG. 7, user interface 700 presents to the user, adapter window 705 where an adapter can be selected from among plural available adapters (not shown) and configured. In one embodiment, prior to presenting adapter window 705 to the user, user interface 700 may present to the user a plurality of types of available adapters for selection. Exemplary types of adapters may include a calculation adapter, a concatenation adapter, a currency adapter, a duration adapter, a fixed-width format adapter, a map adapter, a pattern adapter, a replace adapter, a split adapter, a task number adapter, and a time zone conversion adapter.

The types of adapters that can be selected may depend on the given row, and the corresponding type of data the corresponding mapped columns of the source and target tables are designed to hold. In the example shown in FIG. 7, the type of adapter is pattern adapter 706. As shown in FIG. 7, user interface 700 presents adapter window 705 corresponding to the user selected type of adapter (e.g., pattern adapter 706) to enable the user to configure the adapter for the given selected link 640 of table format 630 for a particular mapped row. The user may configure the adapter in adapter window 705 by setting attributes 710 (e.g., adapter name, adapter application scope, record transformation rule, type, order, description, and the like), and setting attributes 720. Once the user is satisfied with the set attributes 710 and 720, the user may save the adapter by clicking button 730 to complete adapter rule configuration.

Once adapter rule configuration is completed, as shown in FIG. 8, user interface 800 may update table format 630 to show the set adapter for a particular row of table format 630. In the example embodiment shown in FIG. 8, based on user operation, user interface 800 sets and presents in table format 630, adapter link 810 that is configured to replace "INT" string in input replication event data in the "Number" column of the source table with "INTB" string for loading in the "Number" column of the target table.

Once the user is satisfied with configuration of the transformation configuration data of the consumer replication entry 605, in response to user operation of the Update button 670, user interface 600 (700, or 800) may save the target table where incoming replication event data for the specified source table is to be loaded, corresponding column-to-column mapping between the source table and the target table, and configuration of any adapters corresponding to one or more of the target table columns, as transformation configuration data (e.g., transformation configuration data 450 of FIG. 4). Thus, user interface 600 (700/800) allows a user to specify a transform map and store the user specified configuration as transformation configuration data. Transforming and loading engine 435 shown in FIG. 5 may then utilize the stored transformation configuration data 450 and corresponding transformation definition 515 and adapter rules 520 to apply transformation to incoming replication event data for every column of every source table that is part of the consumer replication set and load the transformed data to the corresponding columns of the corresponding target table(s).

Figure 9:
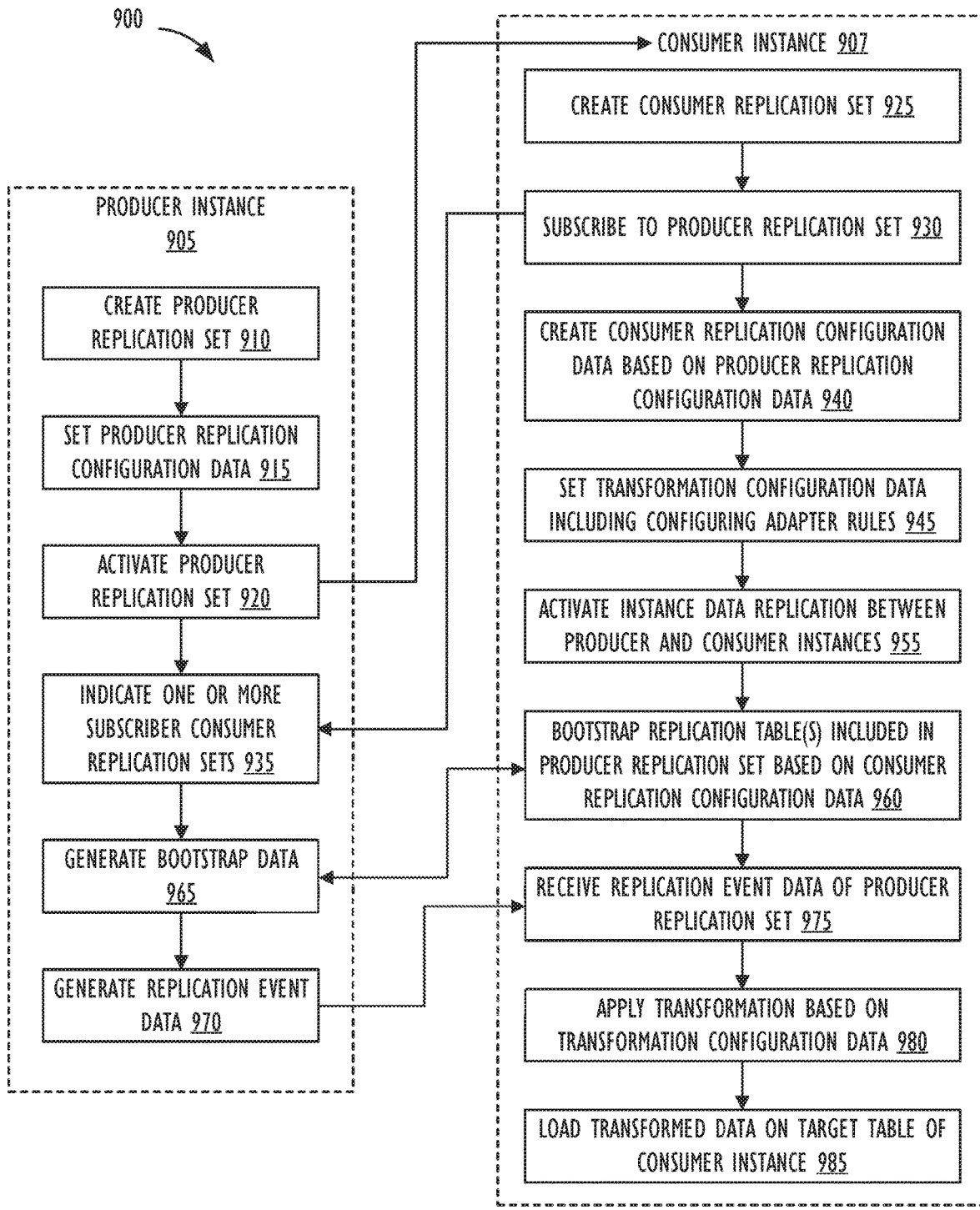
FIG. 9 shows a flow chart illustrating a method for data replication between instances based on transformation configuration data, in accordance with one or more disclosed embodiments.

FIG. 9 shows flow chart 900 illustrating a method for data replication between instances based on transformation configuration data, in accordance with one or more disclosed embodiments. Each of producer instance 905 and consumer instance 907 shown in FIG. 9 may be similar to client instance 208 of FIG. 2 and may belong to the same enterprise or to different enterprise customers. Flow chart 900 begins at block 910 with a processing device (e.g., processing device 300 of FIG. 3) associated with producer instance 905 creating a producer replication set by setting a name and description of the producer replication set and adding one or more source tables of producer instance 905 to the producer replication set as one or more producer replication entries responsive to an operation of a user (e.g., administrator) on, e.g., a user interface. The one or more source tables may be tables that include data of producer instance 905 that is eligible for replication to one or more consumer instances 907. Processing device 300 may restrict the user from including in the producer replication set those tables (e.g., internal tables, configuration tables, script tables, and the like) of producer instance 905 that are not eligible for replication. Further, processing device 300 may set one or more filter criteria associated with the replication source table responsive to operations by the user. The filter criteria may include horizontal filter criteria, vertical filter criteria, attachment filter criteria and the like. Horizontal filter criteria may include filtering based on a predetermined value being attributed to a specific column (or field) of a record of the replication source table (e.g., a record associated with a user in the HR department for the department column in the user table). Vertical filter criteria may include a filter that specifies which columns or fields of records of the replication source table are to be replicated to consumer instance 907 as replication event data. Attachment filter criteria may specify whether or not an attachment associated with a record of the replication source table is to be replicated to consumer instance 907.

At block 915, processing device 300 associated with producer instance 905 may set producer replication configuration data (automatically and/or based on user input) for the producer replication set created at block 910. For each producer replication set, producer replication configuration data set at block 915 may include information regarding one or more corresponding producer replication entries of respective source tables, producer replication set name, producer replication set ID, description, shared encryption/decryption key, producer instance ID, metadata, information regarding one or more subscribing consumer instances that are authorized to receive data from the producer replication set, one or more filter criteria (e.g., horizontal, vertical, or attachment filter criteria), and the like. At block 915, processing device 300 may automatically generate replication setup information like the shared encryption key (authentication key; e.g., AES-256 key) and producer instance ID of producer instance 905 and store the information as part of the producer replication configuration data. Alternately, the shared key may be specified by a user operation. The shared key may be used for securely sharing the data of the replication source table between producer instance 905 and consumer instance 907. For example, processing device 300 of producer instance 905 may encrypt replication event data of the replication source table that is transported out for publication to the logging infrastructure. In one embodiment, symmetric key exchange may be implemented to encrypt data of the replication source table.

At block 920, processing device 300 may activate the producer replication set whose producer replication configuration data is set at block 915, responsive to an operation by the user. Once the replication set is activated, processing device 300 may indicate the producer replication configuration data including the replication setup information of producer instance 905. For example, processing device 300 may display (or otherwise, make available) the replication setup information of producer instance 905 on a display. Further, at block 920, processing device 300 begins monitoring (e.g., via a scheduled job) the replication source table(s) included in the activated producer replication set for detecting data modification events associated with records of the replication source table(s) and for transporting out replication event data based on the producer replication configuration data of producer instance 905 to the logging infrastructure for consumption by subscribing consumer instances.

After the producer replication set is activated, one or more consumer instances 907 may subscribe to the producer replication set and configure instance data replication using the corresponding replication setup information of producer instance 905. For example, at block 925, a processing device (e.g., processing device 300) associated with consumer instance 907 may (e.g., response to user operation on a user interface associated with consumer instance 907) create a consumer replication set by setting a name and description of the consumer replication set. At block 930, after processing device 300 associated with consumer instance 907 has created the consumer replication set, processing device 300 may receive or obtain the replication setup information (e.g., producer replication set name, producer replication set ID, shared encryption key, producer instance ID) of producer instance 905 by the user manually entering the information in a user interface of consumer instance 907. Alternately, processing device 300 at block 930 may automatically obtain the information from producer instance 905 electronically via predetermined communication channels (e.g., e-mail). Processing device 300 at block 930 may further, responsive to an operation of a user (e.g., administrator) of consumer instance 907, verify the replication setup information with producer instance 905 to securely subscribe to the producer replication set.

At block 935, after the consumer replication set of consumer instance 907 has successfully joined the producer replication set by subscribing to the producer replication set, processing device 300 associated with producer instance 905 may, responsive to a user operation, indicate information (e.g., consumer instance 907 name, consumer instance 907 ID) associated with one or more consumer instances 907 that have subscribed to the producer replication set created at block 910. Thus, a user of producer instance 905 may have visibility into who is consuming data of the producer replication set activated by producer instance 905.

At block 940, processing device 300 associated with consumer instance 907 may create consumer replication configuration data based on producer replication setup information of producer instance 905, and store the consumer replication configuration data. In addition, at block 940, processing device 300 associated with consumer instance 907 may synchronize replication configuration with the producer replication set at producer instance 905 and store the configuration as consumer replication configuration data of consumer instance 907. In particular, consumer replication configuration data of consumer instance 907 may include information regarding one or more corresponding replication target tables of consumer instance 907 where incoming data is to be loaded, information regarding one or more corresponding replication source tables of producer instance 905 sending the data, consumer replication set name, producer and consumer replication set IDs, consumer replication set description, shared encryption/decryption key, producer instance 905 ID, metadata, one or more filter criteria (e.g., horizontal, vertical, or attachment filter criteria), cursor data indicating topic address in logging infrastructure from where consumer instance 907 may resume reading, and the like. Additional consumer instances (not shown) may also subscribe to the same producer replication set of producer instance 905 using the same producer replication setup information. At block 940, responsive to a user operation, processing device 300 of consumer instance 907 may indicate one or more source table names of the replication source table(s) of the producer replication set whose record data is to be replicated onto replication target table(s) on consumer instance 907. Processing device 300 of consumer instance 907 may also indicate the one or more filter criteria associated with the replication source table and additional metadata associated with the producer replication set and the source tables included in the producer replication set.

At block 945, processing device 300 associated with consumer instance 907 may set transformation configuration data and adapter rules in accordance with a user operation on a user interface of processing device 300 associated with consumer instance 907. As shown in FIGS. 6-8, the user interface may enable the user to selectively enable transformation for incoming replication event data corresponding to the consumer replication set by setting a target table on consumer instance 907, source-target column mapping, and any adapter(s) for each mapped target table column. As a result, once activated, processing device 300 associated with consumer instance 907 will transform incoming replication event data based on the transformation configuration data and adapter rules set at block 645, and then load the transformed data on the target table of consumer instance 907.

At block 955, responsive to a user operation, processing device 300 associated with consumer instance 907 may activate data replication for the producer replication set subscribed at block 930, so that consumer replication set on consumer instance 907 can start receiving replication event data. In addition, at block 960, responsive to a user operation, processing device 300 may also (optionally) seed or bootstrap the replication target table of consumer instance 907 by performing a batch download operation of all eligible data currently on the replication source table of the producer replication set. To bootstrap the replication target table at consumer instance 907, processing device 300 associated with producer instance 905 may generate (block 965) and transport out to the logging infrastructure, record data of all records of the replication source table that are eligible for replication based on the one or more filter criteria of the source table that is part of the producer replication set. Users of both producer and consumer instances 905 and 907 may have visibility into progress of the seeding (e.g., batch download), and once seeding is complete, the users may also have visibility into health of the replication, replication setup information, and the like. Processing device 300 of producer instance 905 may further encrypt the data that is to be transported out using the shared key of the producer replication set. Processing device 300 associated with consumer instance 907 may then transport-in and decrypt the bootstrap data corresponding to the consumer replication set from the logging infrastructure, and load the data on corresponding target table on consumer instance 907 (with appropriate column mapping and adapter rules applied based on the transformation configuration data).

At block 970, subsequent to the activation and, optionally, the seeding/bootstrapping, a scheduled job running on processing device 300 of producer instance 905 may continuously and automatically generate in real-time (e.g., every predetermined number of seconds), replication event data in response to data modification events (e.g., insert, update or delete events) made to records on the replication source table of the producer replication set at producer instance 905. Processing device 300 of producer instance 905 may continuously transport-out via the logging infrastructure, the replication event data generated at block 970 to one or more subscribing consumer instances 907. At block 975, processing device 300 of consumer instance 907 may continuously and automatically receive in real-time (e.g., every predetermined number of seconds via a scheduled job running on consumer instance 907), incoming replication event data from the logging infrastructure. At block 980, processing device 300 of consumer instance 907 may apply transformation to the incoming replication event data based on the set transformation configuration data and adapter rules to generate transformed replication event data (as explained of FIG. 5). At block 985, processing device 300 may load the transformed data onto the appropriate columns of the target table of the consumer instance 907.

Thus, an encrypted delta payload generated and transported-out to the logging infrastructure by producer instance 905 will be transported in, decrypted, de-serialized, transformed, and loaded to the appropriate target table specified by the transformation by processing device 300 associated with consumer instance 907 using consumer replication configuration data and transformation configuration data of consumer instance 907 to thereby securely share replication event data from producer instance 905 to the consumer instance 907. Although FIG. 9 illustrates that the blocks of method 900 are implemented in a sequential operation, other embodiments of method 900 may have two or more blocks implemented in parallel operations. In still other embodiments, operation of one or more blocks may be omitted or one or more additional operations of one or more additional blocks may be added, and/or the operations performed in a different order.

Figure 10:
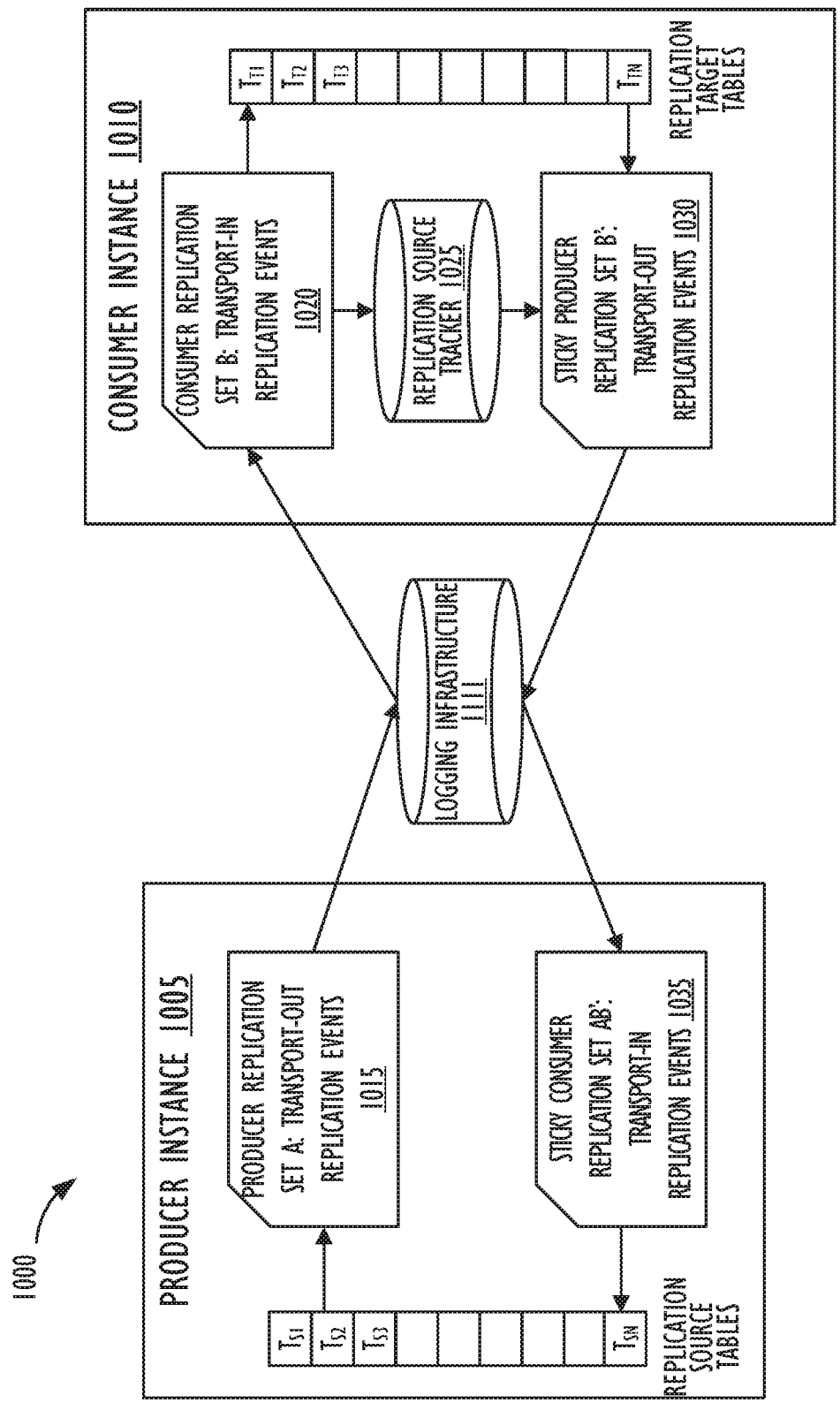
FIG. 10 illustrates a block diagram of another embodiment of an instance data replication system with bi-directional (sticky) replication support.

FIG. 10 illustrates a block diagram of another embodiment of instance data replication (IDR) system 1000 with bi-directional replication support. In the embodiment shown in FIG. 4 (and FIG. 9), IDR system 400 illustrates a one-way replication system where replication event data generated at producer instance 405 is replicated onto consumer instance 410. This functionality can be extended further as explained by way of illustration with IDR system 1000, to provide bi-directional replication support. More specifically, IDR system 1000 of FIG. 10 can be configured so that after replication event data received from producer instance 1005 has been loaded onto the appropriate target table on consumer instance 1010, in response to the loaded data being changed (modified) on the target table at consumer instance 1010, such changes to the data on the target table can be replicated back to the corresponding record of the corresponding source table on producer instance 1005 to provide bi-directional replication support. Such bi-directional replication is also referred to in this disclosure as 'sticky' replication.

Thus, when sticky replication is enabled, consumer instance 1010 may sync changes back to producer instance 1005. When consumer instance 1010 joins sticky replication, reverse replication may be setup automatically. Sticky replication may be described as a special 'one-way' replication from consumer instance 1010 back to producer instance 1005. That is, the consumer may only report on changes happening on consumed records (e.g., records received from the producer as replication event data) back to the originator instance. For example, when consumer instance 1010 loads records via replication (seeding or delta payload of replication event data), consumer instance 1010 may track the originator of the data and determine whom to report changes back to. Thus, sticky replication enables easy setup of reversed replication without manual intervention.

As shown in FIG. 10, DR system 1000 includes producer instance 1005 and consumer instance 1010 that are configured for instance data replication (or sharing) via logging infrastructure 1111. Each of producer instance 1005 and consumer instance 1010 may be similar to client instance 208 of FIG. 2, producer and consumer instances 405, 410 of FIG. 4, or producer and consumer instances 905, 907 of FIG. 9. Further, logging infrastructure 1111 may be similar to logging infrastructure 411 of FIG. 4. Detailed description of logging infrastructure 1111, and of those features of producer and consumer instances 1005, 1010 that are the same as the features of producer and consumer instances 405, 410 of FIG. 4, or producer and consumer instances 905, 907 of FIG. 9, are omitted here. As shown in FIG. 10, producer instance 1005 may include replication source tables $T_{S1}$-$T_{SN}$ corresponding to one or more producer replication entries of one or more producer replication sets, and consumer instance 1010 may include one or more replication target tables $T_{T1}$-$T_{TN}$ corresponding to one or more consumer replication entries of one or more consumer replication sets. Like the embodiments disclosed in FIGS. 4-9, producer and consumer instances 1005, 1010 of IDR system 1000 may be configured to perform replication of record data of one or more of the source tables $T_{S1}$-$T_{SN}$ on to one or more target tables $T_{T1}$-$T_{TN}$.

More specifically, as shown in FIG. 10, producer instance 1005 may include producer replication set A 1015 that may be configured to transport-out replication event data associated with one or more of replication source tables $T_{S1}$-$T_{SN}$ to logging infrastructure 1111 for consumption by one or more consumer instances 1010 subscribing to producer replication set A 1015. Further, consumer instance 1010 may include consumer replication set B 1020 configured to transport-in replication event data of producer replication set A 1015 by reading the data from logging infrastructure 1111, (optionally) performing transformation on the transported-in replication event data based on transformation configuration data, and loading the transformed data onto a target table. For example, when producer instance 1005 transports-out replication event data of source table $T_{S1}$ included in producer replication set A for replication, processing device 300 associated with consumer instance 1010 may utilize consumer replication configuration data and transformation configuration data of consumer replication set B 1020 to load the replication event data from source table $T_{S1}$ onto, e.g., target table $T_{T2}$ of consumer instance 1010. Further, the transformation configuration data of consumer replication set B 1020 may specify a mapping of incoming columns of source table $T_{S1}$ to respective columns of target table $T_{T2}$ for loading of the data. Still further, transformation configuration data of consumer replication set B 1020 may specify for zero or more of the mapped columns of target table $T_{T2}$, a respective adapter indicating a predetermined rule for converting or changing the incoming data of the corresponding column prior to loading the data onto the mapped target column of target table $T_{T2}$. In this IDR system 1000, a user interface of processing device 300 associated with either of producer instance 1005 or consumer instance 1010 may (e.g., based on user operation) enable 'sticky' replication, so that any changes made to a record that is loaded on target table $T_{T2}$ because of replication from producer instance 1005, may be replicated back to the corresponding record on source table $T_{S1}$ of producer instance 1005.

Figure 11:
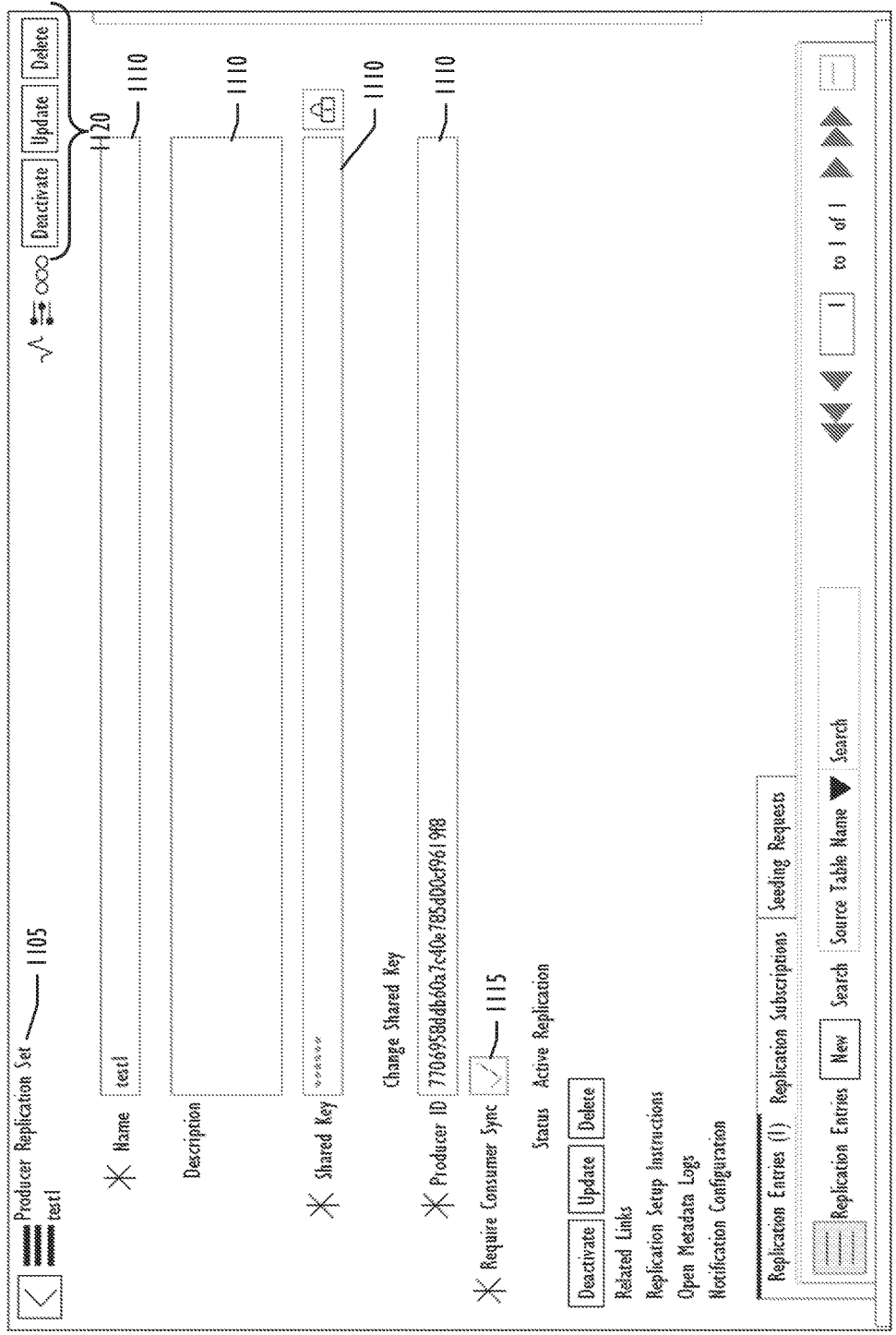
FIG. 11 illustrates an embodiment of a producer replication set a user can create on a user interface to enable sticky replication with a consumer instance.

FIG. 11 illustrates an embodiment of user interface 1100 for creating producer replication set 1105 that enables sticky replication between producer and consumer instances (e.g., producer and consumer instances 1005, 1010). As illustrated in FIG. 11, user interface 1100 of processing device 300 associated with producer instance 1005 may enable a user of producer instance 1005 to configure producer replication set 1105 by setting attributes 1110 such as name and description of producer replication set 1105. Further, user interface 1100 may automatically generate (or enable the user to input) replication setup information (e.g., attributes 1110 corresponding to shared key and producer ID) that may be used by a subscribing consumer instance 1010 to activate and start receiving replication event data of producer replication set 1105 from producer instance 1005. User interface 1100 may further enable the user to enable/disable sticky replication by checking/unchecking checkbox 1115 ("Require Consumer Sync") and saving changes (e.g., via buttons 1120) to producer replication set 1105. In response to the user checking checkbox 1115 and saving the changes to producer replication set 1105, processing device(s) 300 associated with one or both of producer and consumer instances 1005, 1010 may automatically create respective sticky replication sets on producer and consumer instances 1005, 1010 (e.g., producer replication set B' 1030 on consumer instance 1010, and consumer replication set AB' 1035 on producer instance 1005) and activate the sticky sets to configure sticky replication between the producer and consumer instances 1005, 1010.

More specifically, in response to a sticky replication flag being set to true (e.g., checkbox 1115 of user interface 1100 FIG. 11 being checked) in producer replication configuration data for producer replication set A 1015 and/or in consumer replication configuration data for consumer replication set B 1020, processing device 300 associated with consumer instance 1010 may automatically create producer replication set B' 1030 on consumer instance 1010, and processing device 300 associated with producer instance 1005 may automatically create consumer replication set AB' 1035 associated with producer instance 1005, and both processing devices 300 (which may be the same device) may activate replication between sets B' and AB'. In particular, processing device 300 associated with consumer instance 1010 may utilize consumer replication configuration data and transformation configuration data associated with consumer replication set B 1020 to configure and save sticky producer replication set B' 1030, and similarly, processing device 300 associated with producer instance 1005 may utilize producer replication configuration data associated with producer replication set A 1015 to configure and save sticky consumer replication set AB' 1035. Thus, all of producer and consumer replication sets 1015, 1020, 1030, and 1035 may share the same configuration data. Consumer instance 1010 may further include replication source tracker 1025 (e.g., tracking engine) to track a plurality of records that have been transported-in by consumer replication set B 1020 and loaded onto the target table $T_{T1}$-$T_{TN}$. Replication source tracker 1025 may include one or more tables that may store a unique identifier for each record transported-in and loaded on the target table of the consumer replication set B 1020. For example, replication source tracker 1025 may log a sys_id (e.g., primary key) of each record on a particular source table $T_{S1}$-$T_{SN}$ that has been replicated and loaded (with or without transformation) on a particular corresponding target table $T_{T1}$-$T_{TN}$.

Processing device 300 associated with consumer instance 1010 may then (e.g., via a scheduled job) automatically and continuously generate in real-time (e.g., every predetermined number of seconds), sticky replication event data (e.g., delta payload data of a difference between a version of a target table record prior to the associated sticky modification event and a version of the record subsequent to the modification) in response to sticky data modification events (e.g., insert, update or delete events) associated with records whose sys_id is logged on replication source tracker 1025, and which are on a particular target table $T_{T1}$-$T_{TN}$ that is included in producer replication set B' 1030. Processing device 300 of consumer instance 1010 may continuously transport-out to logging infrastructure 1111 the sticky replication event data thus generated corresponding to producer replication set B' 1030.

Conversely, processing device 300 of producer instance 1005 may (e.g., via a corresponding scheduled job) automatically and continuously receive in real-time (e.g., every predetermined number of seconds), incoming sticky replication event data from logging infrastructure 1111 based on configuration data associated with sticky consumer replication set AB' 1035. Processing device 300 associated with producer instance 1005 may then load the transported-in sticky replication event data associated with set AB' 1035 onto a corresponding replication source table $T_{S1}$-$T_{SN}$, to update a record on the source table $T_{S1}$-$T_{SN}$, which record was replicated onto the target table of consumer instance 1010, and which underwent a change while being loaded onto the target table of consumer instance 1010. Further, processing device 300 associated with producer instance 1005 may utilize transformation configuration data associated with consumer replication set B 1020 to de-transform any transformations applied to the replication event data when the data was loaded onto the target table on consumer instance 1010. For example, a dollar value in a given column on the source table on producer instance 1005 may be converted (transformed) at consumer instance 1010 to a different currency by utilizing the currency adapter, and loaded onto a given column on the target table on consumer instance 1010. Further, the different currency value may be subsequently modified and the modified value saved in the given column on the target table on the consumer instance. In this case, processing device 300 associated with producer instance 1005 may apply a corresponding reverse transformation based on the currency adapter to convert the modified value from the different currency back to a dollar value prior to loading the modified dollar value onto the given column of the corresponding record on the source table of producer instance 1005, to thereby reflect on the source table, the change made to the different currency value on the target table.

Figure 12:
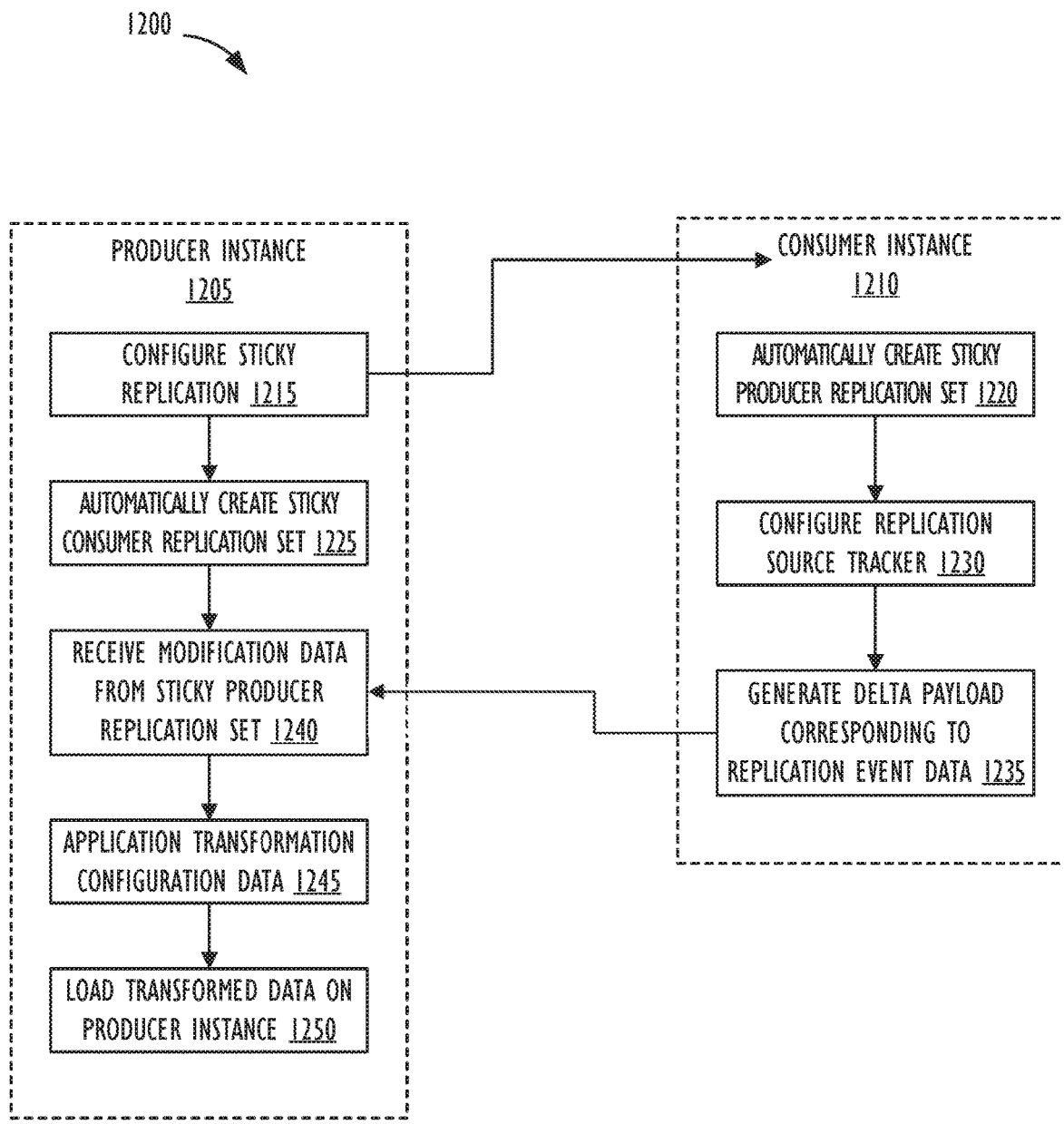
FIG. 12 shows a flow chart illustrating method for configuring and executing sticky replication between instances, in accordance with one or more disclosed embodiments.

FIG. 12 shows flow chart 1200 illustrating a flow for configuring and executing sticky replication between instances, in accordance with one or more disclosed embodiments. Producer instance 1205 and consumer instance 1210 shown in FIG. 12 may be similar to producer instance 905 and consumer instance 907 shown in FIG. 9, and may provide functionality similar to that provided by producer instance 905 and consumer instance 907. Detailed description of the features of producer and consumer instances 1205 and 1210 that are the same as the features of producer and consumer instances 905 and 907 of FIG. 9, are omitted here. As shown in FIG. 12, method 1200 begins at block 1215 with processing device 300 associated with producer instance 1205 configuring sticky replication. For example, processing device 300 associated with producer instance 1205 may enable sticky replication between producer and consumer instances 1205 and 1210 in response to a sticky replication flag being set to true (e.g., checkbox 1115 of user interface 1100 FIG. 11 being checked) in producer replication configuration data for a producer replication set.

In response to producer instance 1205 (or consumer instance 1210) being configured for sticky replication at block 1215, processing device 300 associated with consumer instance 1210 may automatically create a sticky producer replication set on consumer instance 1210 (block 1220), and processing device 300 associated with producer instance 1205 may automatically create a sticky consumer replication set on producer instance 1205 (block 1225). More specifically, at block 1220, processing device 300 associated with consumer instance 1210 may configure and save the sticky producer replication set by utilizing consumer replication configuration data and transformation configuration data associated with a consumer replication set corresponding to a producer replication set for which sticky replication was enabled at block 1215. Similarly, at block 1225, processing device 300 associated with producer instance 1205 configure and save the sticky consumer replication set by utilizing producer replication configuration data associated with the producer replication set for which sticky replication was enabled at block 1215 and utilizing any transformation configuration data associated with the corresponding consumer replication set.

At block 1230, processing device 300 associated with consumer instance 1210 may further configure a replication source tracker (e.g., tracking engine) to track a plurality of records transported-in as replication event data corresponding to a particular consumer replication set and loaded onto the particular target table. At block 1235, processing device 300 associated with consumer instance 1210 may (e.g., via a scheduled job) automatically and continuously generate in real-time (e.g., every predetermined number of seconds), sticky replication event data (e.g., delta payload data of a difference between a version of a target table record prior to the associated sticky modification event and a version of the record subsequent to the modification) in response to sticky data modification events (e.g., insert, update or delete events) associated with records being tracked by the tracking engine at block 1230, and which are on the particular target table. For example, the delta payload may be generated at block 1235 when a user at consumer instance 1210 modifies or changes a record on a target table where incoming replication event data from a source table on producer instance 1205 has been loaded. At block 1235, processing device 300 of consumer instance 1210 may continuously transport-out to a logging infrastructure, the sticky replication event data thus generated corresponding to the sticky producer replication set created at block 1220.

At block 1240, processing device 300 of producer instance 1205 may (e.g., via a corresponding scheduled job) automatically and continuously receive in real-time (e.g., every predetermined number of seconds), incoming sticky replication event data, e.g., from a logging infrastructure, based on configuration data associated with sticky consumer replication set created at block 1225. At block 1245, processing device 300 associated with producer instance 1205 may utilize transformation configuration data associated with the sticky consumer replication set to de-transform any transformations applied to the replication event data when the data was loaded onto the target table on consumer instance 1210. At block 1250, processing device 300 associated with producer instance 1202 may then load the transported-in and transformed sticky replication event data associated with the sticky consumer replication set created at block 1225 onto a corresponding replication source table, so as to update a record on the source table, which record was replicated onto the target table of consumer instance 1210, and which underwent a change while being loaded onto the target table of consumer instance 1210. Although FIG. 12 illustrates that the blocks of method 1200 are implemented in a sequential operation, other embodiments of method 1200 may have two or more blocks implemented in parallel operations. In still other embodiments, operation of one or more blocks may be omitted or one or more additional operations of one or more additional blocks may be added, and/or the operations performed in a different order.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A system comprising:
   non-transitory memory; and
   one or more hardware processors configured to read instructions from the non-transitory memory to cause the one or more hardware processors to:
   set transformation configuration data for a consumer replication data set on a cloud-based consumer instance, the consumer replication data set defining replication of data from a source table included in a producer replication data set of a cloud-based producer instance to the cloud-based consumer instance, wherein the transformation configuration data identifies at least one of:
   (i) a target table in the consumer replication data set on the cloud-based consumer instance to receive incoming data from the source table included in the producer replication data set; and
   (ii) a mapping of incoming fields of the source table of the producer replication data set to respective fields of the target table in the consumer replication data set;
   receive, via a logging infrastructure communicatively coupled to the cloud-based producer instance and the cloud-based consumer instance, encrypted replication event data published by the cloud-based producer instance and associated with a data modification event for a record in the source table included in the producer replication data set subscribed to by the cloud-based consumer instance, wherein the logging infrastructure comprises a publish/subscribe-model messaging platform configured to receive the replication event data from the cloud-based producer instance, wherein the encrypted replication event data is encrypted using a shared key;
   decrypt the encrypted replication event data using the shared key;
   transform the decrypted replication event data into key-value pairs based on the set transformation configuration data, wherein the cloud-based consumer instance comprises a transformation application programming interface (API); and
   load the transformed replication event data into the target table in the consumer replication data set on the cloud-based consumer instance.

2. The system according to claim 1, wherein the instructions that cause the one or more hardware processors to set the transformation configuration data comprise instructions that cause the one or more hardware processors to set an adapter for a given one of the respective fields of the target table in the consumer replication data set, and
   wherein the instructions that cause the one or more hardware processors to transform the received replication event data comprise instructions that cause the one or more hardware processors to change the received replication event data for a predetermined one of the incoming fields of the source table that is mapped to the given field of the target table, based on the set adapter.

3. The system according to claim 2, wherein the adapter changes incoming data for the predetermined field of the record on the source table by applying a predetermined rule to the incoming data before loading the changed data on the mapped given field of the record on the target table.

4. The system according to claim 3, wherein the adapter is one of a calculation adapter, a concatenation adapter, a currency adapter, a duration adapter, a fixed-width format adapter, a map adapter, a pattern adapter, a replace adapter, a split adapter, a task number adapter, and a time zone conversion adapter.

5. The system according to claim 1, wherein the one or more hardware processors are configured to read instructions from the non-transitory memory to cause the one or more hardware processors to:
   create a sticky producer replication data set on the cloud-based consumer instance based on producer replication configuration data of the producer replication data set, wherein the sticky producer replication data set is created in response to a determination that a sticky replication flag is set to true in the producer replication configuration data;
   track, in a tracking engine on the cloud-based consumer instance, a plurality of records of the source table included in the producer replication data set for each of which the cloud-based consumer instance receives replication event data via the logging infrastructure for loading the incoming data on the target table;
   generate, in response to determining that one of the plurality of records tracked by the tracking engine has been modified on the target table in the cloud-based consumer instance, a delta payload corresponding to the one of the plurality of records; and
   transmit the generated delta payload to the cloud-based producer instance for loading the modified record on the source table in the cloud-based producer instance.

6. The system according to claim 5, wherein the one or more hardware processors are configured to read instructions from the non-transitory memory to cause the one or more hardware processors to:

create a sticky consumer replication data set on the cloud-based producer instance based on the producer replication configuration data of the producer replication set, wherein the sticky consumer replication set is created in response to the determination that the sticky replication flag is set to true in the producer replication configuration data;

receive the delta payload on the cloud-based producer instance from the cloud-based consumer instance;

transform the received delta payload on the cloud-based producer instance based on the set transformation configuration data and the producer replication configuration data; and load the transformed delta payload on the source table on the cloud-based producer instance so as to update a record associated with the delta payload on the source table included in the producer replication data set.

7. The system according to claim 5, wherein the producer replication configuration data includes one or more of: information regarding the source table of the producer replication data set whose data is to be replicated, a replication set ID, a producer instance ID, the shared key for encrypting/decrypting the data of the source table, horizontal filter criteria for replicating data of the source table, and vertical filter criteria for replicating data of the source table.

8. The system according to claim 1, wherein the data modification event is one or more of an insert, update, and delete event associated with the record of the source table on the cloud-based producer instance.

9. A method for transforming replicated instance data, comprising:

setting transformation configuration data for a consumer replication data set on a cloud-based consumer instance, the consumer replication data set defining replication of data from a source table included in a producer replication data set of a cloud-based producer instance, wherein the transformation configuration data identifies at least one of:
  (i) a target table in the consumer replication data set on the cloud-based consumer instance to receive incoming data from the source table included in the producer replication data set; and
  (ii) a mapping of incoming fields of the source table of the producer replication data set to respective fields of the target table in the consumer replication data set;

receiving, via a logging infrastructure communicatively coupled to the cloud-based producer instance and the cloud-based consumer instance, encrypted replication event data published by the cloud-based producer instance and associated with a data modification event for a record in the source table included in the producer replication data set subscribed to by the cloud-based consumer instance, wherein the logging infrastructure comprises a publish/subscribe-model messaging platform configured to receive the replication event data from the cloud-based producer instance, wherein the encrypted replication event data is encrypted using a shared key;

decrypting the encrypted replication event data using the shared key;

transforming the decrypted replication event data into key-value pairs based on the set transformation configuration data, wherein the cloud-based consumer instance comprises a transformation application programming interface (API); and loading the transformed replication event data into the specified target table in the consumer replication data set on the cloud-based consumer instance.

10. The method according to claim 9, wherein setting the transformation configuration data comprises setting an adapter for a given one of the respective fields of the target table in the consumer replication data set, and wherein transforming the received replication event data comprises changing the received replication event data for a predetermined one of the incoming fields of the source table that is mapped to the given field of the target table, based on the set adapter.

11. The method according to claim 10, wherein the adapter changes incoming data for the predetermined field of the record on the source table by applying a predetermined rule to the incoming data before loading the changed data on the mapped given field of the record on the target table.

12. The method according to claim 9, comprising:

creating a sticky producer replication data set on the cloud-based consumer instance based on producer replication configuration data of the producer replication data set, wherein the sticky producer replication data set is created in response to a determination that a sticky replication flag is set to true in the producer replication configuration data;

tracking, in a tracking engine on the cloud-based consumer instance, a plurality of records of the source table included in the producer replication data set for each of which the cloud-based consumer instance receives replication event data via the logging infrastructure for loading the incoming data on the target table;

generating, in response to determining that one of the plurality of records tracked by the tracking engine has been modified on the target table in the cloud-based consumer instance, a delta payload corresponding to the one of the plurality of records; and transmitting the generated delta payload to the cloud-based producer instance for loading the modified record on the source table in the cloud-based producer instance.

13. The method according to claim 12, comprising:

creating a sticky consumer replication data set on the cloud-based producer instance based on the producer replication configuration data of the producer replication data set, wherein the sticky consumer replication data set is created in response to the determination that the sticky replication flag is set to true in the producer replication configuration data;

receiving the delta payload on the cloud-based producer instance from the cloud-based consumer instance;

transforming the received delta payload on the cloud-based producer instance based on the set transformation configuration data and the producer replication configuration data; and loading the transformed delta payload on the source table on the cloud-based producer instance so as to update a record associated with the delta payload on the source table included in the producer replication data set.

14. The method according to claim 12, wherein the producer replication configuration data includes one or more of: information regarding the source table of the producer replication data set whose data is to be replicated, a replication set ID, a producer instance ID, the shared key for encrypting/decrypting the data of the source table, horizontal filter criteria for replicating data of the source table, and vertical filter criteria for replicating data of the source table.

15. A non-transitory computer readable recording medium having stored thereon a program for transforming replicated instance data, comprising computer executable instructions that when executed by one or more processing units cause the one or more processing units to:
  set transformation configuration data for a consumer replication data set on a cloud-based consumer instance, the consumer replication data set defining replication of data from a source table included in a producer replication data set of a cloud-based producer instance to a cloud-based consumer instance, wherein the transformation configuration data identifies at least one of: (i) a target table in the consumer replication data set on the cloud-based consumer instance to receive incoming data from the source table included in the producer replication data set; and (ii) a mapping of incoming fields of the source table of the producer replication data set to respective fields of the target table in the consumer replication data set;
  receive, via a logging infrastructure communicatively coupled to the cloud-based producer instance and the cloud-based consumer instance, encrypted replication event data published by the cloud-based producer instance and associated with a data modification event for a record in the source table included in the producer replication data set subscribed to by the cloud-based consumer instance, wherein the logging infrastructure comprises a publish/subscribe-model messaging platform configured to receive the replication event data from the cloud-based producer instance, wherein the encrypted replication event data is encrypted using a shared key;
  decrypt the encrypted replication event data using the shared key;
  transform the decrypted replication event data into key-value pairs based on the set transformation configuration data, wherein the cloud-based consumer instance comprises a transformation application programming interface (API); and
  load the transformed replication event data into the target table in the consumer replication data set on the cloud-based consumer instance.

16. The non-transitory computer readable medium according to claim 15, wherein the instructions that cause the one or more processing units to set the transformation configuration data comprise instructions that cause the one or more processing units to set an adapter for a given one of the respective fields of the target table in the consumer replication data set, and
  wherein the instructions that cause the one or more processing units to transform the received replication event data comprise instructions that cause the one or more processing units to change the received replication event data for a predetermined one of the incoming fields of the source table that is mapped to the given field of the target table, based on the set adapter.

17. The non-transitory computer readable medium according to claim 15, wherein the instructions cause the one or more processing units to:
  create a sticky producer replication data set on the cloud-based consumer instance based on producer replication configuration data of the producer replication data set, wherein the sticky producer replication data set is created in response to a determination that a sticky replication flag is set to true in the producer replication configuration data;
  track, in a tracking engine on the cloud-based consumer instance, a plurality of records of the source table included in the producer replication data set for each of which the cloud-based consumer instance receives replication event data via the logging infrastructure for loading the incoming data on the target table;
  generate, in response to determining that one of the plurality of records tracked by the tracking engine has been modified on the target table in the cloud-based consumer instance, a delta payload corresponding to the one of the plurality of records; and
  transmit the generated delta payload to the cloud-based producer instance for loading the modified record on the source table in the cloud-based producer instance.

18. The non-transitory computer readable medium according to claim 17, wherein the instructions cause the one or more processing units to:
  create a sticky consumer replication on the producer instance data set based on the producer replication configuration data of the producer replication data set, wherein the sticky consumer replication data set is created in response to the determination that the sticky replication flag is set to true in the producer replication configuration data;
  receive the delta payload on the cloud-based producer instance from the cloud-based consumer instance;
  transform the received delta payload on the cloud-based producer instance based on the set transformation configuration data and the producer replication configuration data; and
  load the transformed delta payload on the source table on the cloud-based producer instance so as to update a record associated with the delta payload on the source table included in the producer replication data set.

19. The system according to claim 1, wherein each of the key-value pairs comprises a key corresponding to a column of the target table and a value from the transformed decrypted replication event data.

20. The system according to claim 1, wherein the transformed replication event data is loaded into the target table via a Java class.

* * * * *